(12) United States Patent
Hamada et al.

(10) Patent No.: US 11,494,042 B2
(45) Date of Patent: Nov. 8, 2022

(54) SEMICONDUCTOR DEVICE, CHARACTER RECOGNITION DEVICE, AND CHARACTER RECOGNITION METHODS

(71) Applicant: RENESAS ELECTRONICS CORPORATION, Tokyo (JP)

(72) Inventors: Shoichi Hamada, Tokyo (JP); Koji Hirano, Tokyo (JP); Kakeru Kimura, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 17/190,975

(22) Filed: Mar. 3, 2021

(65) Prior Publication Data
US 2021/0333945 A1 Oct. 28, 2021

(30) Foreign Application Priority Data

Apr. 23, 2020 (JP) .............................. JP2020-076395

(51) Int. Cl.
G06F 3/044 (2006.01)
G06F 3/041 (2006.01)
(52) U.S. Cl.
CPC .......... *G06F 3/0446* (2019.05); *G06F 3/0412* (2013.01); *G06F 2203/04106* (2013.01)

(58) Field of Classification Search
CPC ................. G06F 3/0446; G06F 3/0412; G06F 2203/04106
See application file for complete search history.

(56) References Cited

U.S. PATENT DOCUMENTS

| 9,543,947 | B2 | 1/2017 | Araki | |
| 2003/0064686 | A1* | 4/2003 | Thomason | G06F 3/042 |
| | | | | 455/566 |
| 2007/0052688 | A1* | 3/2007 | Muranaka | G06F 3/04883 |
| | | | | 345/173 |

FOREIGN PATENT DOCUMENTS

JP 2015-012377 A 1/2015

* cited by examiner

*Primary Examiner* — Peter D McLoone
(74) *Attorney, Agent, or Firm* — McDermott Will & Emery LLP

(57) ABSTRACT

A semiconductor device includes: a sensor detecting electric capacitance of a touch key group comprising a plurality of touch keys arranged in a matrix; and a control device configured to perform character recognition based on a change in the electric capacitance of the plurality of touch keys detected by the sensor and on a sampling pattern that is time-series data of a loci.

18 Claims, 27 Drawing Sheets time(mili-second)

FIG. 19

| SYMBOL | 1 | 2 | 3 |
|---|---|---|---|
| INPUT PATTERN | | | |

| SYMBOL | 4 | 5 | 6 |
|---|---|---|---|
| INPUT PATTERN | | | |

| SYMBOL | 7 | 8 | 9 |
|---|---|---|---|
| INPUT PATTERN | | | |

| SYMBOL | 0 | | |
|---|---|---|---|
| INPUT PATTERN | | | |

SEMICONDUCTOR DEVICE, CHARACTER RECOGNITION DEVICE, AND CHARACTER RECOGNITION METHODS

CROSS-REFERENCE TO RELATED APPLICATIONS

The present application claims priority from Japanese Patent Application No. 2020-076395 filed on Apr. 23, 2020, the content of which is hereby incorporated by reference to this application.

BACKGROUND

The present disclosure relates to a semiconducting device, and is applicable to, for example, a semiconductor device having a built-in capacitance sensor.

When a user inputs characters and symbols in home appliances such as white goods, an LCD (Liquid Crystal Display) panel and a character recognition function are required. Here, characters and symbols are simply referred to as "characters" below. Further, when the user inputs the characters through a smartphone (s), the inputted characters need to be transmitted to the home appliances by using wireless communication such as WiFi and the home appliance needs a wireless function (s). An amount of data on one screen handled to analyze character loci etc. of the LCD panel is large. Furthermore, in order to improve a character recognition rate, data for several frames also needs to be retained and a large-capacity memory for handling accumulated data is also required. This is, for example, disclosed in Japanese Patent Application laid-open No. 2015-12377 A.

SUMMARY

Pattern recognition can be realized by using a touch screen of the LCD panel. However, as described above, in order to recognize the characters, a large amount of data needs to be stored and further needs to be calculated and discriminated. Consequently, devices such as a memory and a CPU become highly functional and expensive, and a time required for recognition also becomes long.

A brief outline of the representative one of this disclosure is as follows.

That is, a semiconductor device includes: a sensor detecting electric capacitance of a touch key group, the touch key group comprising a plurality of touch keys arranged in a matrix; and a control device configured to perform character recognition based on a change in electric capacitance of the plurality of touch keys detected by the sensor and on a sampling pattern that is time-series data of a locus.

According to the above-mentioned semiconductor device, the character recognition can be easily performed.

BRIEF DESCRIPTION OF THE DRAWINGS

FIG. 19 a view showing input patterns of numbers and symbols in the third modification example.

DETAILED DESCRIPTION

Figure 1:
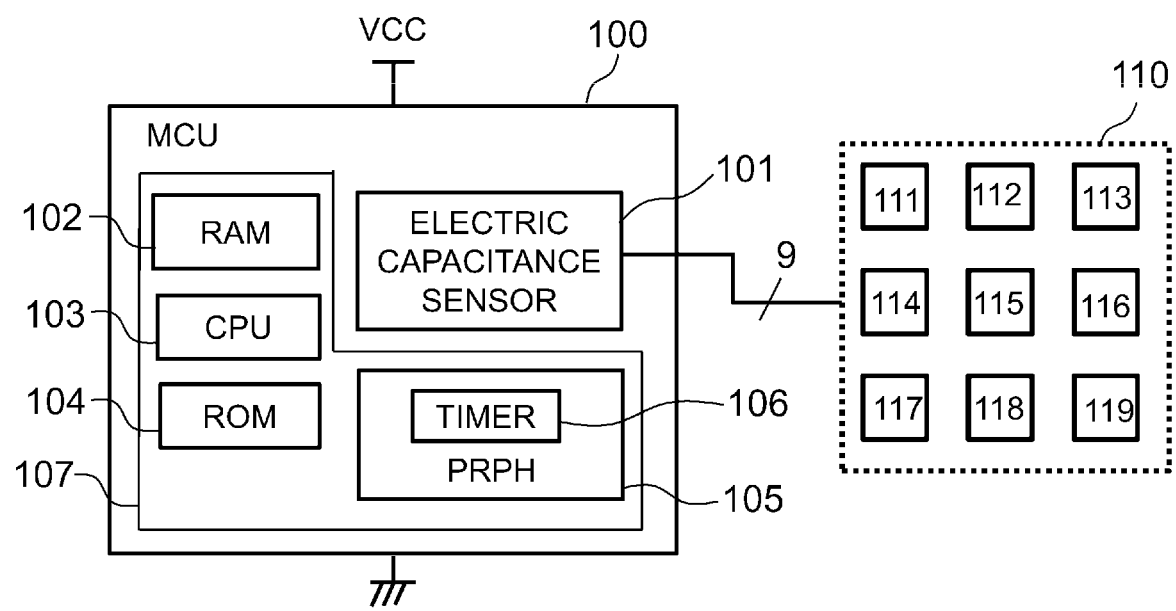
FIG. 1 is a block diagram showing a configuration of a character recognition device according to an embodiment.

Hereinafter, embodiments and modification examples will be described with reference to the drawings. However, in the following description, the same reference numerals may be denoted to the same components, and a repetitive description thereof may be omitted. Incidentally, in order to clarify the explanation, the drawings may schematically represent the width, thickness, and shape, etc. of each part as compared with the actual embodiment, but this is just an example and does not limit the interpretation of the present disclosure.

EMBODIMENT

FIG. 1 is a block diagram showing a configuration of a character recognition device according to an embodiment.

A character recognition device 10 includes an MCU (Micro Controller Unit) 100 and a touch key group 110. The MCU 100 includes an electric capacitance sensor 101 and a control device 107. The MCU 100 is not particularly limited, but is configured as a system-on-chip semiconductor device formed on a single semiconductor substrate such as single crystal silicon by a complementary MOS integrated circuit manufacturing technique or the like. Further, the control device 107 includes, for example, a CPU (Central Processing Unit) 103, a RAM 102, a ROM 104, a PRPH 105 as a peripheral circuit, and the like.

The ROM 104 comprises a non-volatile memory such as a flash memory, and stores programs and data used by the CPU 103. The CPU 103 controls the electric capacitance sensor 101 and recognizes characters based on an output of the electric capacitance sensor 101. The RAM 102 comprises a volatile memory such as a SRAM (Static Random Access Memory), and temporarily stores data and the like required while the CPU 103 is executing a program (s). The PRPH 105 includes a timer 106, a not-shown interface circuit with other devices such as communication circuits, and the like.

The electric capacitance sensor 101 is a circuit for measuring electric capacitance of each of touch keys 111 to 119 constituting a touch key group 110. The electric capacitance sensor 101 may measure the electric capacitance by a voltage conversion method that uses an A/D converter, or may measure the electric capacitance by a current pulse drive method. Electric capacitive sensors (touch sensor circuits, sensor circuits) are incorporated herein with reference to US 2015/2219 and US 2018/368733.

The touch key group 110 includes, for example, the touch keys 111 to 119 arranged in a 3×3 matrix. Each of the touch keys 111 to 119 is connected to a semiconductor device 100. The touch keys 111 to 119 are electrodes formed of copper foil on a substrate that is made of an insulating base material having a low dielectric constant such as FR-4. This makes it possible to manufacture the touch key group 110 by using a general printed circuit board(s). It is assumed that a distance between the adjacent electrodes is a space (gap) having such a distance that when the electrodes are touched with a finger, the two adjacent electrodes cannot be touched at the same time. The touch keys 111 to 119 are self-capacity detection type touch keys.

The character recognition device 10 may have a configuration in which the MCU 100 and the touch key group 110 are mounted on a printed circuit board and the MCU 100 and the touch key group 110 are connected by a wiring(s) formed of a copper foil(s). Further, the character recognition device 10 may be configured so that a metal foil or the like serving as an electrode is adhered to a surface of an insulator such as glass to form the touch key group 110 and that the electrode and the MCU 100 are connected by a lead wire(s).

Figure 2:
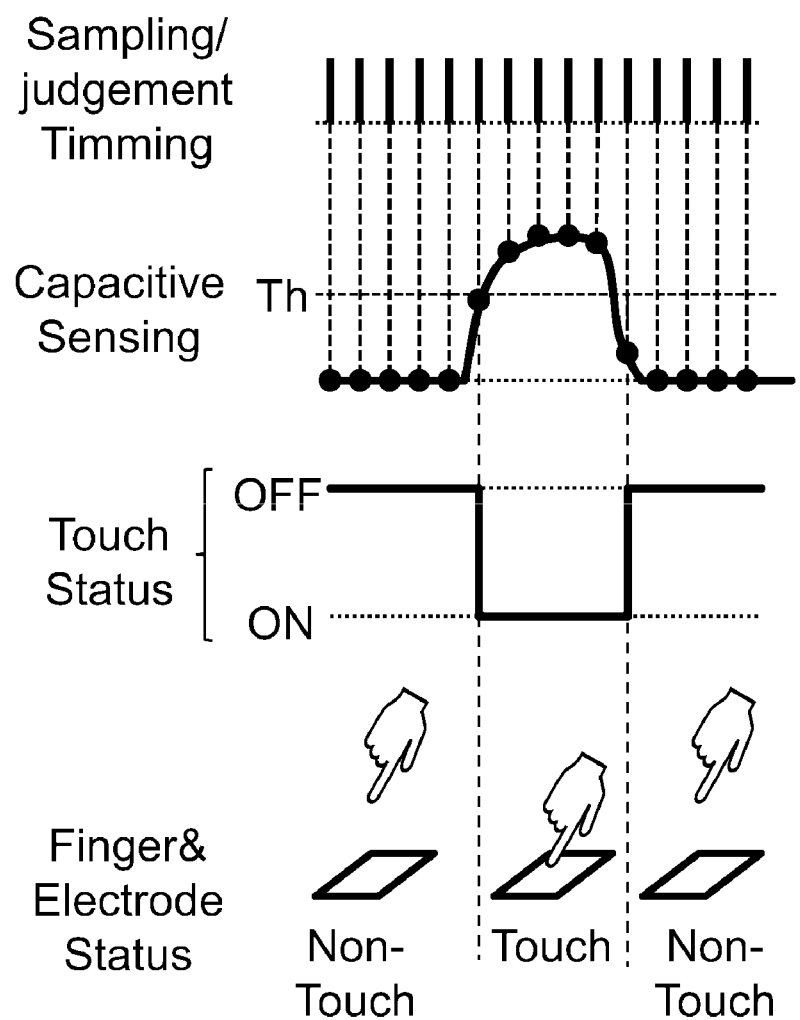
FIG. 2 is a view showing a status detection method of a touch key in the embodiment.

A sampling operation of a single touch key will be described with reference to FIG. 2. FIG. 2 is a view showing a status detection method of a touch key in the embodiment.

In general, the touch key outputs a judgment result as a binary digital value under the condition that the touch key is in an OFF state (Non-touch) when a user's finger is away from the electrode and is in an ON state (Touch) when the finger contacts with the electrode. Each of the touch keys 111 to 119 in the touch key group 110 shown in FIG. 1 independently detects both the ON and OFF states.

The electric capacitance sensor 101 samples (senses) the electric capacitance between the finger and the electrode per predetermined interval of time and retains it. Here, a sensing result(s) is not an ON and OFF digital value ("1" or "0" of 1 bit) but a multi-bit digital value of electric capacitance, which is an analog amount. The control device 107 stores the electric capacitance in the RAM 102, for example, based on an interrupt signal from the electric capacitance sensor 101. A threshold value (Th) for determining the ON and OFF states is stored in the RAM 102 or ROM 104. For example, the control device 107 determines the OFF state when the sensing result is below (or at and below) the threshold value, and determines the ON state when the sensing result is at or above (or over) the threshold value.

Incidentally, the electric capacitance sensor 101 may retain the threshold value, and the electric capacitance sensor 101 itself may output a judgement result of a digital value of ON or OFF. In order to reduce operating power of the electric capacitance sensor 101, the timer 106 may be used to intermittently operate the sensing.

Figure 3:
FIG. 3 is a view showing an example of input patterns of numbers and symbols in the embodiment.

The pattern input will be described with reference to FIG. 3. FIG. 3 is a view showing an example of an input pattern of numbers and symbols in the embodiment.

The patterns to be recognized are inputted by tracing the electrodes of the touch key group 110 from a starting point to an endpoint without releasing the finger therefrom. Here, in FIG. 3, black circles indicate the starting points of the touch, and arrows indicate the endpoints of the touch. For example, in inputting the character "1", the touch keys 112, 115, 118 are traced with the finger so as to be turned ON continuously in order thereof. In inputting the character "3", the touch keys 111, 112, 113, 116, 115, 116, 119, 118, and 117 are traced with the finger so as to be turned ON continuously in order thereof. In inputting (entering) the symbol ". (period)", the touch key 119 is traced with the finger so as to be turns ON.

The above-mentioned input pattern example is just an example and is not limited to this. For example, the input pattern of the character "3" may be traced with the finger so that the touch keys 111, 112, 113, 116, 115, 114, 115, 116, 119, 118, 117 are turned ON continuously in order thereof.

Further, the input pattern of the character "3" may be traced with the finger so that the touch keys 112, 113, 116, 115, 116, 119, and 118 are turned ON continuously in order thereof.

Figure 4:
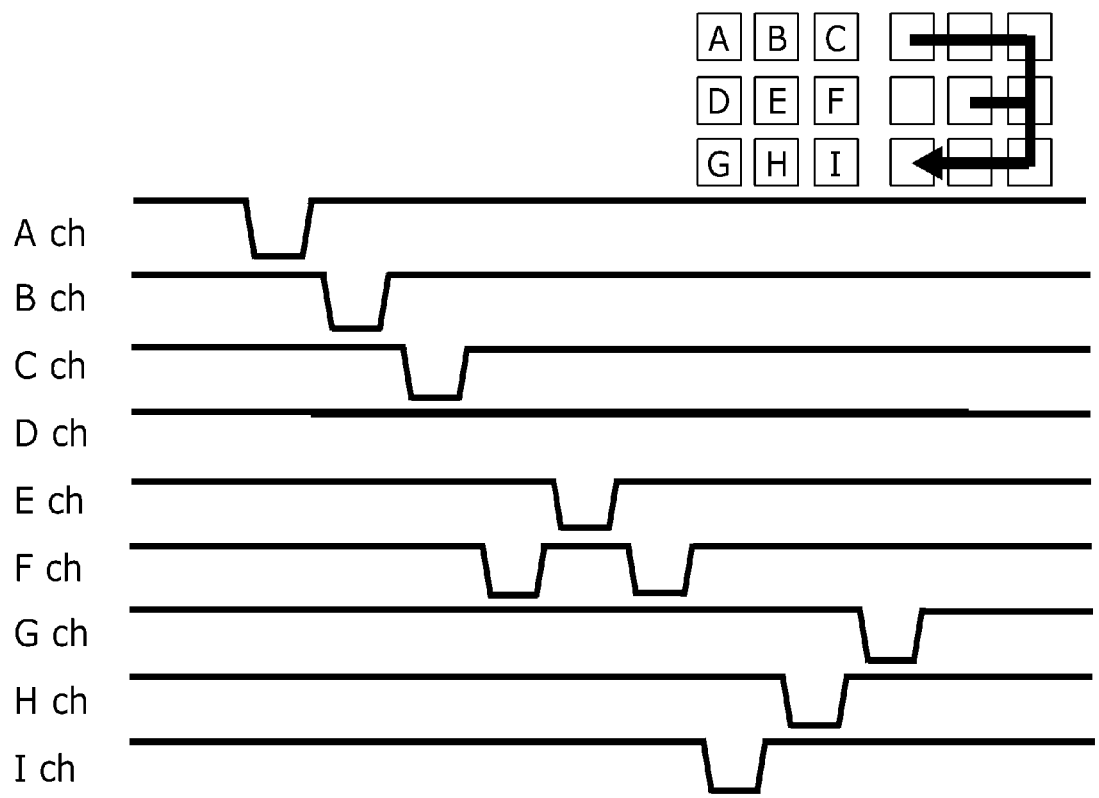
FIG. 4 is a view showing an example of a reference pattern of the character "3".
Figure 5:
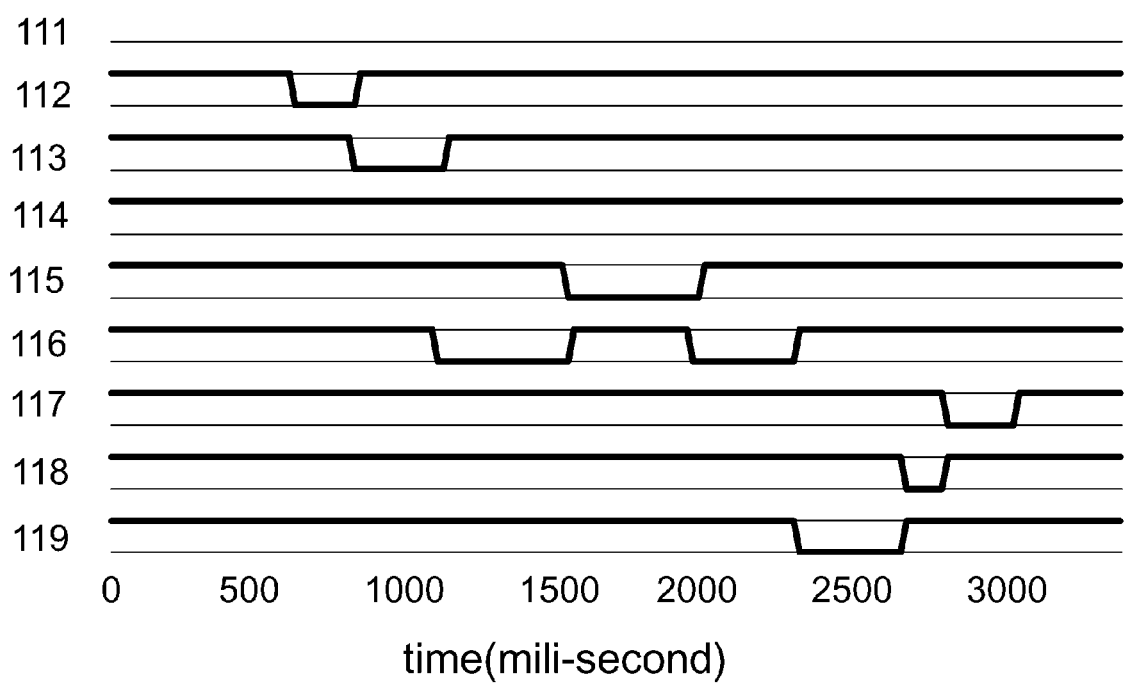
FIG. 5 is a view showing an example of a sequence pattern of the character "3".
Figure 6:
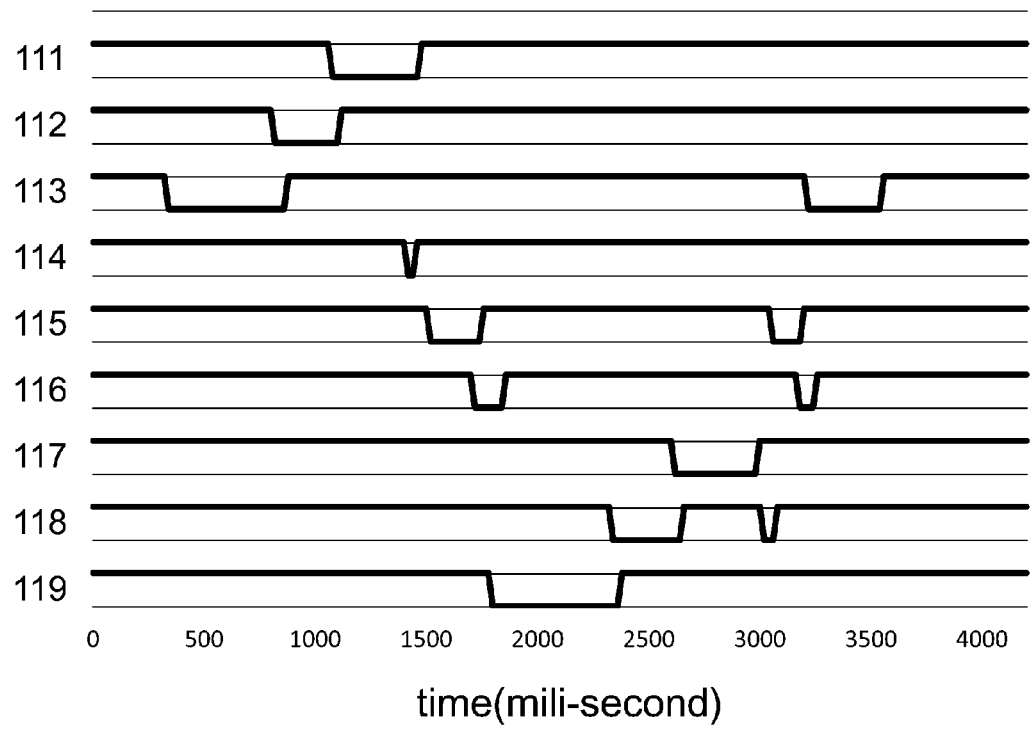
FIG. 6 is a view showing an example of a sequence pattern of the character "8".
Figure 7:
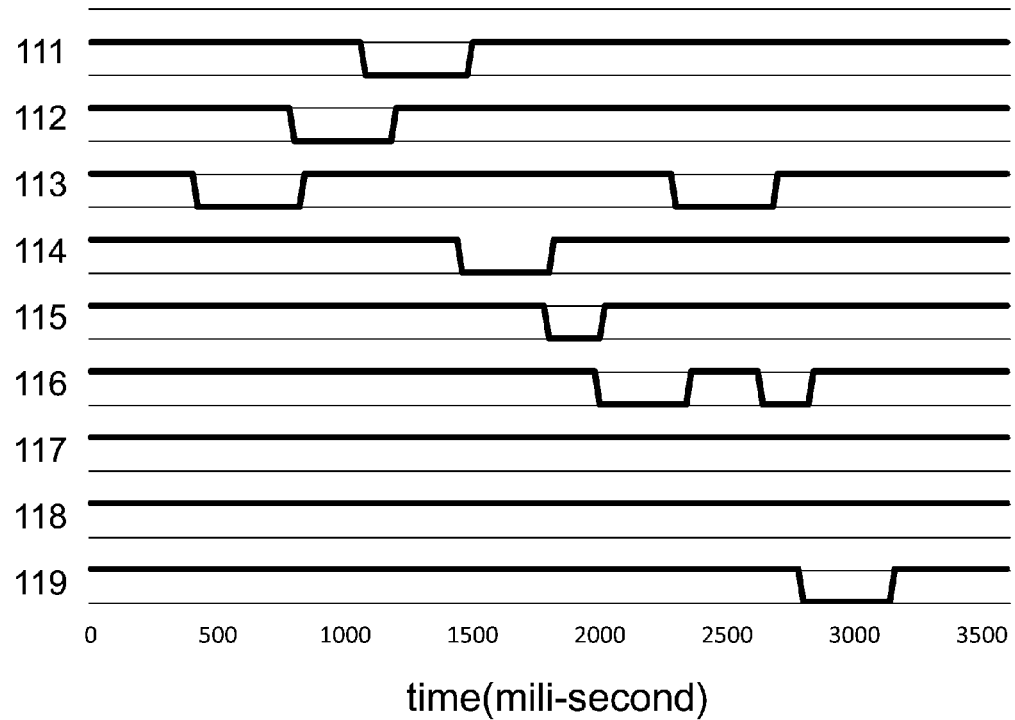
FIG. 7 is a view showing an example of a sequence pattern of the character "9".
Figure 8:
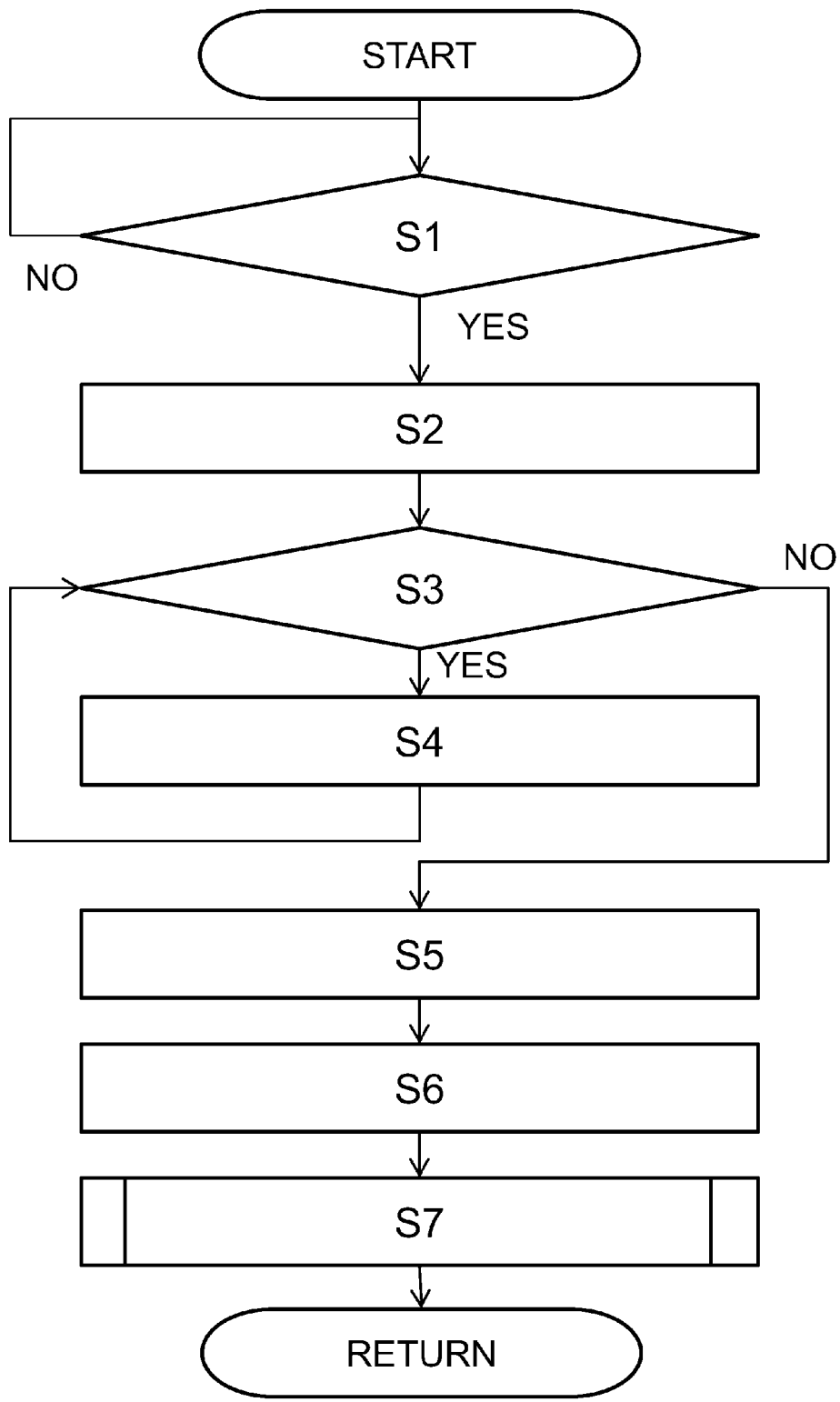
FIG. 8 is a flowchart showing pattern recognition in the embodiment.

Pattern recognition will be described with reference to FIGS. 4 to 8. FIG. 4 is a view showing an example of a reference pattern of the character "3". FIG. 5 is a view showing an example of a sampling pattern of the character "3". FIG. 6 is a view showing an example of a sampling pattern of the character "8". FIG. 7 is a view showing an example of a sampling pattern of the character "9". FIG. 8 is a flowchart showing pattern recognition in the embodiment.

(Touch Judgment: Step S1, Sampling Start: S2)

(a) Starting-Point Detection

When the control device 107 detects that any of the touch keys 111 to 119 is turned ON, it determines that a pattern input has started. Then, the control device 107 starts sampling and starts recording, in the RAM 102, both of detection states and time-series information of all the touch keys of the touch key group 110. Here, the detection state of the touch key is a binary digital value that represents the ON or OFF state determined by comparing the electric capacitance of the touch key with a predetermined threshold value (Th).

(Sampling Continuation: Step S4)

(b) Recording of Detection State

The control device 107 continues to record data in the RAM 102 on the detection state of the touch key during a time period of tracing the touch key group 110 according to the input pattern example. Here, the detection state of the touch key is recorded in the RAM 102 together with the time-series information.

(Touch Continuation Judgment: Step S3)

(c) 0End-Point Detection

The control device 107: detects that all the touch keys 111 to 119 are on the OFF states; determines that the inputs are completed when a predetermined time elapses; and stops data recording of the detection states of the touch keys in the RAM 102.

(Frame Segmentation: Step S5, Time Axis Scaling: Step S6)

(d) Generation of Sampling Pattern

The control device 107 segments the detection state and time-series information of the touch key group 110 for one character recorded in the RAM 102, scales them on a time axis, and expands (develops) them into a sampling pattern as shown in FIGS. 5 to 7. Here, the sampling pattern is a sequential pattern in which loci (trajectories) of the input patterns are arranged in chronological order.

(Pattern Matching: Step S7)

(e-1) Pattern Matching

The control device 107 compares the sampling pattern as shown in FIGS. 5 to 7 with the reference pattern as shown in FIG. 4. Here, the reference pattern is a sequential pattern in which the loci of the input patterns are arranged in chronological order for each touch key and different patterns for each input pattern are stored in advance in the ROM 104 or the RAM 102. The control device 107 recognizes the symbols of the matched reference patterns as a symbol corresponding to the input pattern. For example, since the sampling pattern shown in FIG. 5 and the reference pattern shown in FIG. 4 match, the control device 107 recognizes the character "3" as an input pattern.

Since the sampling pattern and the reference pattern have time-series information, the control device 107 can detect an ON time of a predetermined time or less as noise, and can remove this noise. This makes it possible to improve accuracy of the matching.

(e-2) Pattern Matching Including Touch-Time Information

The sequential pattern of the above-mentioned reference pattern is used as a first reference pattern, and a time information pattern obtained by statistically calculating the ON time at a time of the pattern input is used as a second reference pattern. The first reference pattern and the second reference pattern may be stored and retained in the ROM 104 or the RAM 102. In this case, the control device 107 can compare the sampling pattern with two types of reference patterns comprising the sequential pattern and the time information pattern. This makes it possible to further improve a pattern recognition rate.

The ON time at the time of the pattern input, which is used for the second reference pattern, will be described below. The locus of the input pattern (input locus of touch key) has the following five patterns.

Pattern 1: Starting point;

Pattern 2: Locus passing in a straight line between adjacent touch keys;

Pattern 3: Locus fold back at a right angle or an acute angle;

Pattern 4: Locus inverted on the same touch key; and

Pattern 5: End point.

Since the finger surely passes the touch keys in order to express the input patterns, times required for the finger to draw the loci in passing the touch keys are different. That is, the times during which the touch keys are touched differ depending on the input pattern. For example, when the character "3" is inputted, the touch keys 113, 116, 119 corresponding to the pattern 3 and the touch key 115 corresponding to the pattern 4 are longer in the touching time than the touch keys 112, 118 corresponding to the pattern 2. Human beings take care not for the finger to deviate from the touch keys in drawing the loci, so that the touching times change for stopping for a moment in the pattern 3 and the pattern 4.

In performing the pattern matching, the following condition determination may be performed instead of the second reference pattern.

For example, the touch key corresponding to the pattern 2 performs the condition determination of whether it has ten counts or less; the touch key corresponding to the pattern 3 performs the condition determination of whether it has ten to twenty counts; the electrode corresponding to the pattern 4 performs the condition determination of whether it has twenty counts or more; and the like. Here, the "count" is, for example, a count value of the "counter 14" disclosed in US 2015/2219. Alternatively, if it is assumed that the ON time of each touch key is t2 for pattern 2, t3 for pattern 3, and t4 for pattern 4, the condition determination of whether $t2 < t3 \leq t4$ is met is performed.

If a failure is made of the condition determination in the pattern matching of (e-2), accuracy of the determination decreases, but the determination may be performed again by the pattern matching of (e-1).

According to the embodiment, it has one or more of the following effects.

(1) Since the characters can be recognized by a change in the electric capacitance of the touch keys and the loci, the touch key group can be used as an input device besides operations of the ON and OFF states of the touch key. The characters and symbols etc. can be entered with multiple simple keys, so that character input functions can be incorporated in a wide range of products.

(2) Since the pattern is inputted by tracing each touch key, a character recognition rate can be increased with a small amount of data by using this detection order of the touch keys as simple stroke order information.

(3) Since a key input sequence is made time-series data for drawing the characters, an amount of time-series data capacity to be saved is small and can be used in a wide range of products such as products with small built-in memories.

(4) Since the embodiment does not need to have completely linear data during the character inputs and plots only the detection order of reference points, the amount of data in the entire character recognition process can be reduced.

MODIFICATION EXAMPLE

Hereinafter, some typical modification examples of the embodiment will be illustrated. In the following description of the modification example, the same reference numerals as those in the above-described embodiment may be used for portions having the same configuration and function as those described in the above-described embodiment. As for the explanation of such portions, the explanation of the above-described embodiment can be appropriately employed within a technically consistent range. In addition, a part of the above-described embodiment and all or some of a plurality of modification examples can be compositely applied within a technically consistent range as appropriate.

First Modification Example

In a first modification example, a touch-key sensing result is interpolated by using a sensing result when the finger is between the touch keys.

Figure 9:
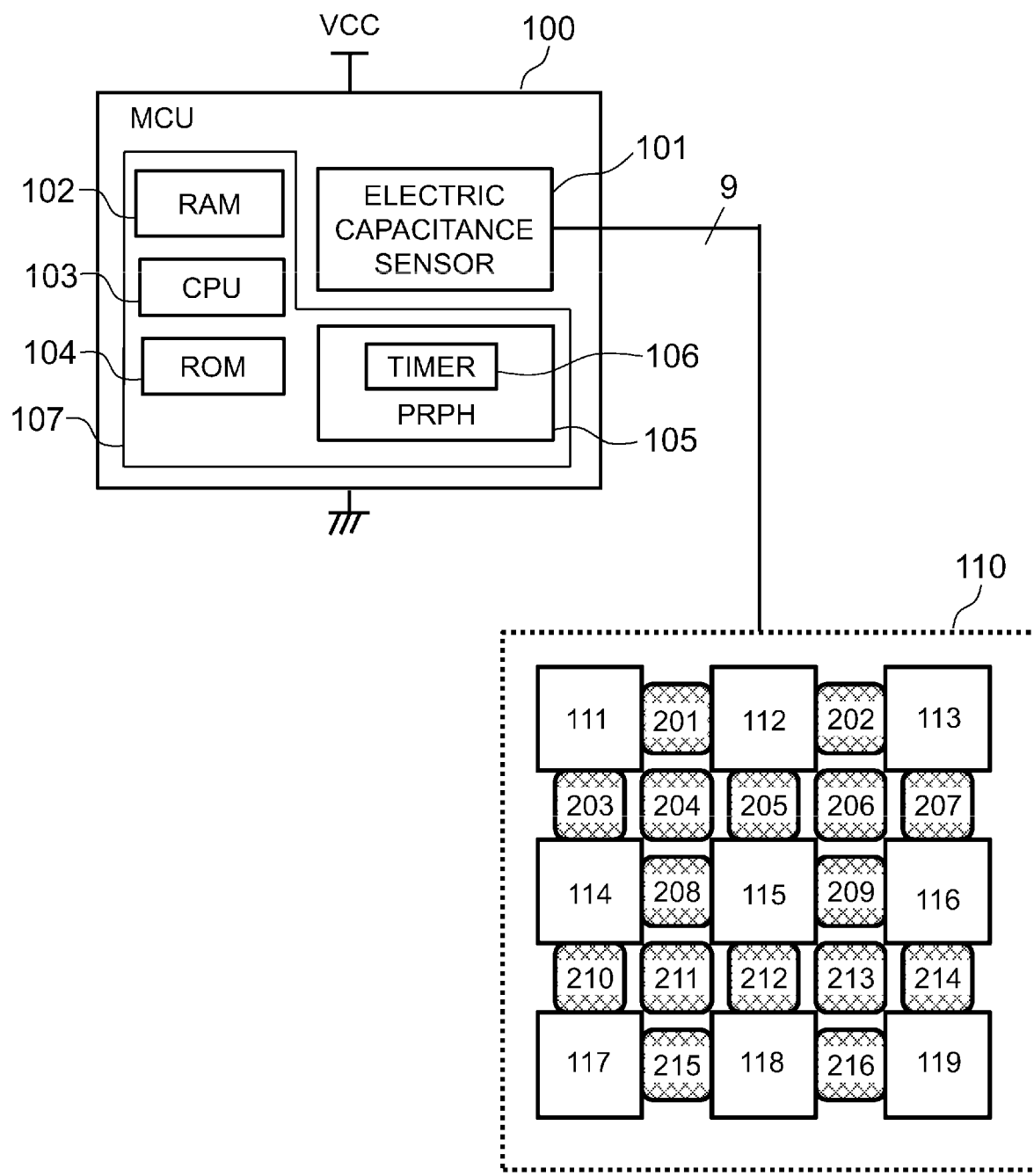
FIG. 9 is a view showing a virtual key in a first modification example.

A configuration of a character recognition device in the first modification example will be described with reference to FIG. 9. FIG. 9 is a block diagram showing a configuration of a character recognition device in a first modification example.

The configurations of the MCU 100 and the touch key group 110 in the character recognition device of the first modification example are the same as those of the character recognition device of the embodiment. However, the touch key group 110 is configured by arranging virtual keys 201 to 216 between the touch keys of the touch keys 111 to 119. The virtual keys 201 to 216 are not electrodes made of metal but are conceptual touch keys that can determine ON and OFF states like the touch keys 111 to 119 of the electrodes. Consequently, the number of measurement points increases from 9 to 25, so that the sampling accuracy of the input pattern can be improved.

Figure 10:
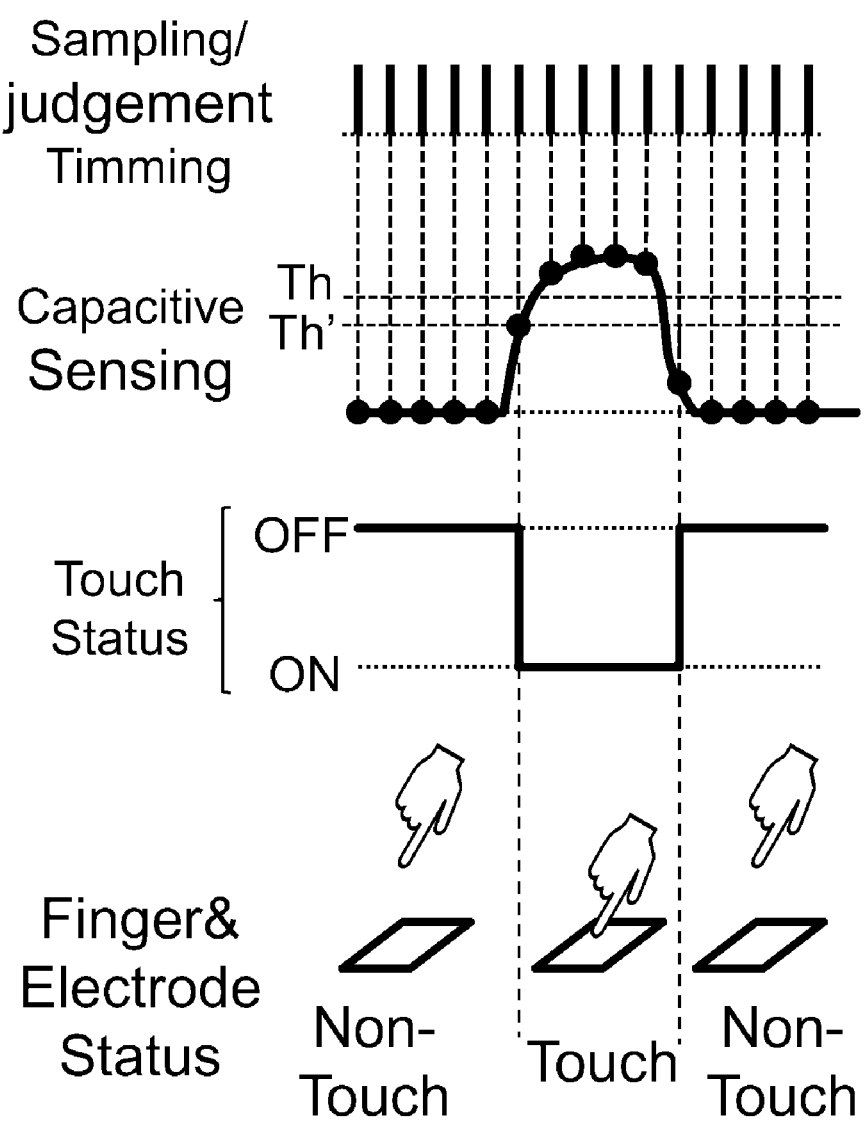
FIG. 10 is a view showing a status detection method of a touch key in the first modification example.

A sampling operation of a single touch key will be described with reference to FIG. 10. FIG. 10 is a view showing a status detection method of a touch key in the first modification example.

ON and OFF operations of the touch keys 111 to 119 are the same as those in the embodiment. However, in the first modification example, a threshold value (Th') lower than the threshold value (Th) of the embodiment can be set, and ON determination thereof can be made earlier at a rising edge of an analog waveform of the electric capacitance.

A pattern input in the first modification example is the same as that of the operation of the embodiment described with reference to FIG. 3.

Figure 11:
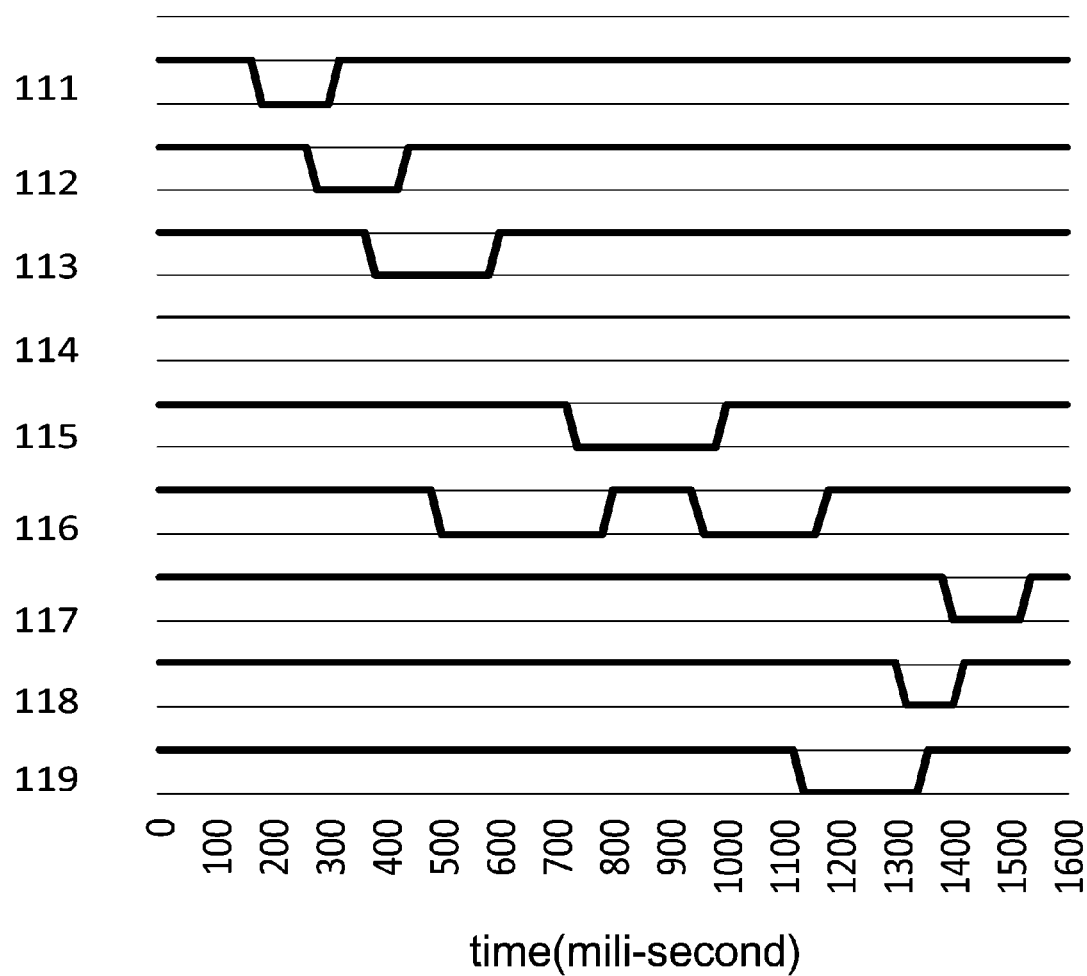
FIG. 11 is a view showing a sampling pattern when the character "3" in the first modification example is inputted.
Figure 12:
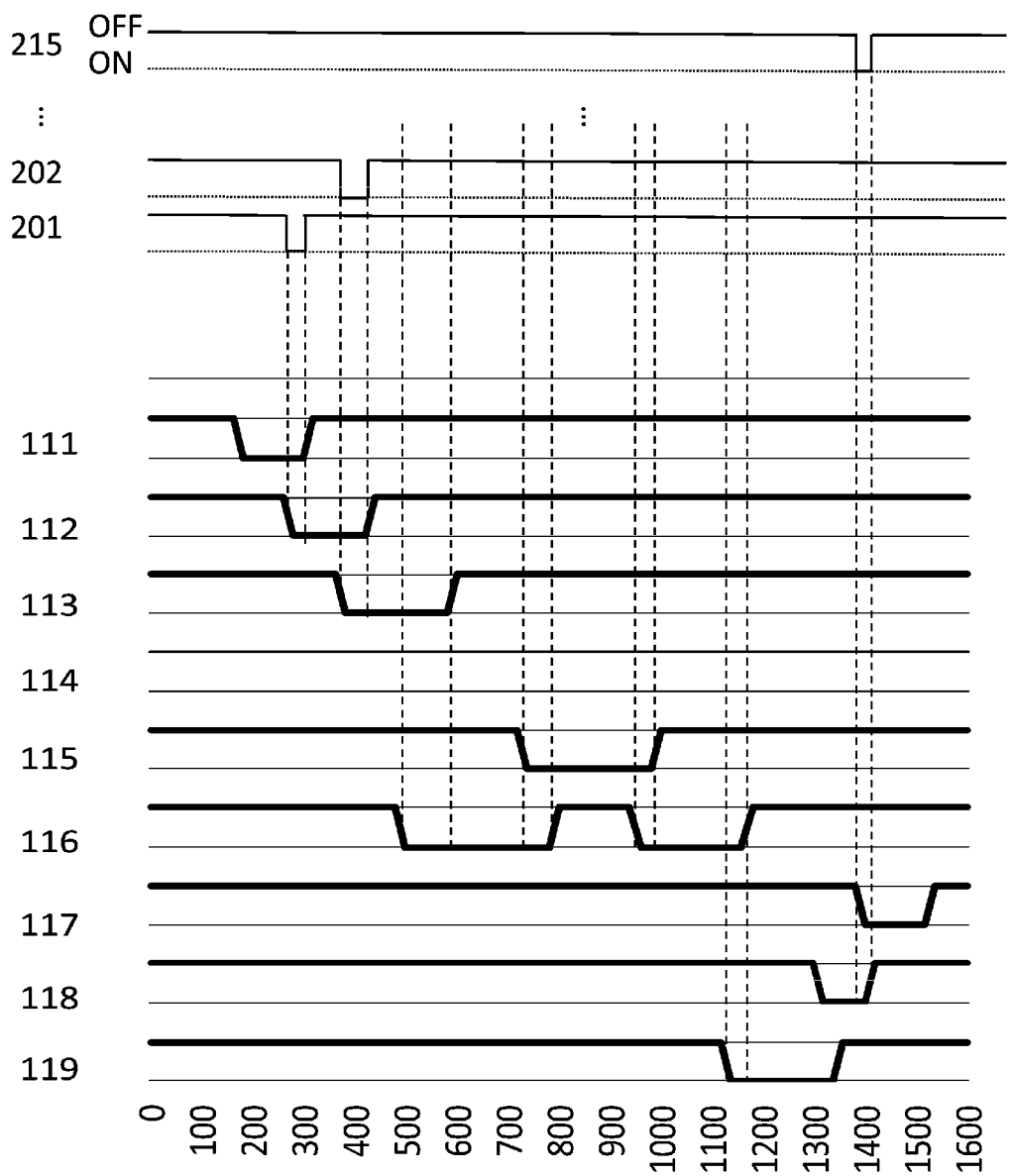
FIG. 12 is a diagram for explaining a method of generating information on a virtual key based on the sampling patter shown in FIG. 11.

Pattern recognition will be described with reference to FIGS. 8, 11 and 12. FIG. 11 is a view showing a sampling pattern when the character "3" in the first modification example is inputted. FIG. 12 is a diagram for explaining a method of generating virtual-key information based on the sampling pattern in FIG. 11.

The control device 107 performs (a) starting-point detection, (b) recording of detection states, and (c) end-point detection in steps S1 to S4 in the same manner as those in the embodiment.
(Frame Segmentation: Step S5, Time Axis Scaling: Step S6)
(D) Interpolation Processing of Virtual Electrodes Similar to the embodiment, the control device 107 segments the detection state and time-series information of the touch key group 110 for one character recorded in the RAM 102, scales them on the time axis, and expands (develops) them into a sampling pattern as shown in FIG. 11. Then, as shown in FIG. 12, the control device 107 generates ON or OFF information of the virtual keys 201 to 216 by a logical operation of ON and OFF information between adjacent touch keys. Here, when ON is set to "1" and OFF is set to "0", a logical product operation is performed as a logical operation. This detects that the adjacent touch keys are simultaneously pressed. For example, the control device 107 calculates a detection state of the virtual key 201 by computing a logical product of detection states of the touch keys 111 and 112. Further, the control device 107 calculates a detection state of the virtual key 204 by computing a logical product of detection states of the touch keys 111, 112, 114, and 115.
(Pattern Matching: Step S7)
(e-1) Pattern Matching The control device 107 compares, similarly to the embodiment, the sampling patterns of the touch keys 111 to 119 and the virtual keys 201 to 216 with the reference patterns stored in advance in the RAM 102 or the like. The control device 107 recognizes the symbols of the matched reference patterns as a symbol corresponding to the input pattern. Here, the reference pattern of the first modification example is a pattern including ON and OFF information of the virtual key assumed from the locus of the input pattern. The control device 107 performs pattern matching in the same processing as that in the embodiment.

According to the first modification example, it has one or more of the following effects.

(1) A key-to-key intermediate position that cannot be detected by a normal tact key switch can be detected.

(2) Since the touch-key sensing result and the sensing result when the finger is between the touch keys are interpolated as input information between the touch keys, the accuracy of the pattern recognition can be improved.

(3) The number of patterns matching points increases by increasing the number of measurement points, so that if the number of portions at which the sampling patterns and the reference patterns match is a constant ratio or more, their processings can also be regarded as pattern matching and the accuracy of the matching can be improved.

(4) An amount of information of the sampling patterns increases twice or more as compared with the embodiment, so that even if the touch key information is lost due to noise, a collation result with the reference pattern can be improved.

(5) If the measurement points of the electric capacitance sensor are simply increased, the sampling accuracy is improved, but the sensing time is also increased proportionally. Consequently, the operating time of the MCU increases, and power consumption thereof also increases proportionally. Further, due to the characteristics of the electric capacitance sensor, as an adjacent distance between the touch keys is shorter, the sensitivity due to an increase in parasitic capacitance is lower, so that designing the touch-key patterns with high accuracy becomes difficult. In an interpolation method by the virtual electrodes in this modification example, improvement of the sampling accuracy can be expected without increasing the number of measurement points of the sensor, so that the power consumption of the sensing does not increase. The operating time for computing the logical product increases, but it is shorter than the operating time due to an increase in the measurement points of the sensor. The increase in power consumption is suppressed, which makes it possible to improve the matching accuracy. The electrode pattern design is also easy because the adjacent distance between the electrodes may be an interval of suppressing the generation of parasitic capacitance.

Second Modification Example

In a second modification example, a sensing result when the finger is on the touch key and is between the touch keys is used, and the symbol of the input pattern is inferred by a machine learning model. A character recognition device in the second modification example: adds, to the character recognition device in the first modification example, a learned model in which the reference pattern is learned in advance by machine learning; and infers with the learned model.

Figure 13:
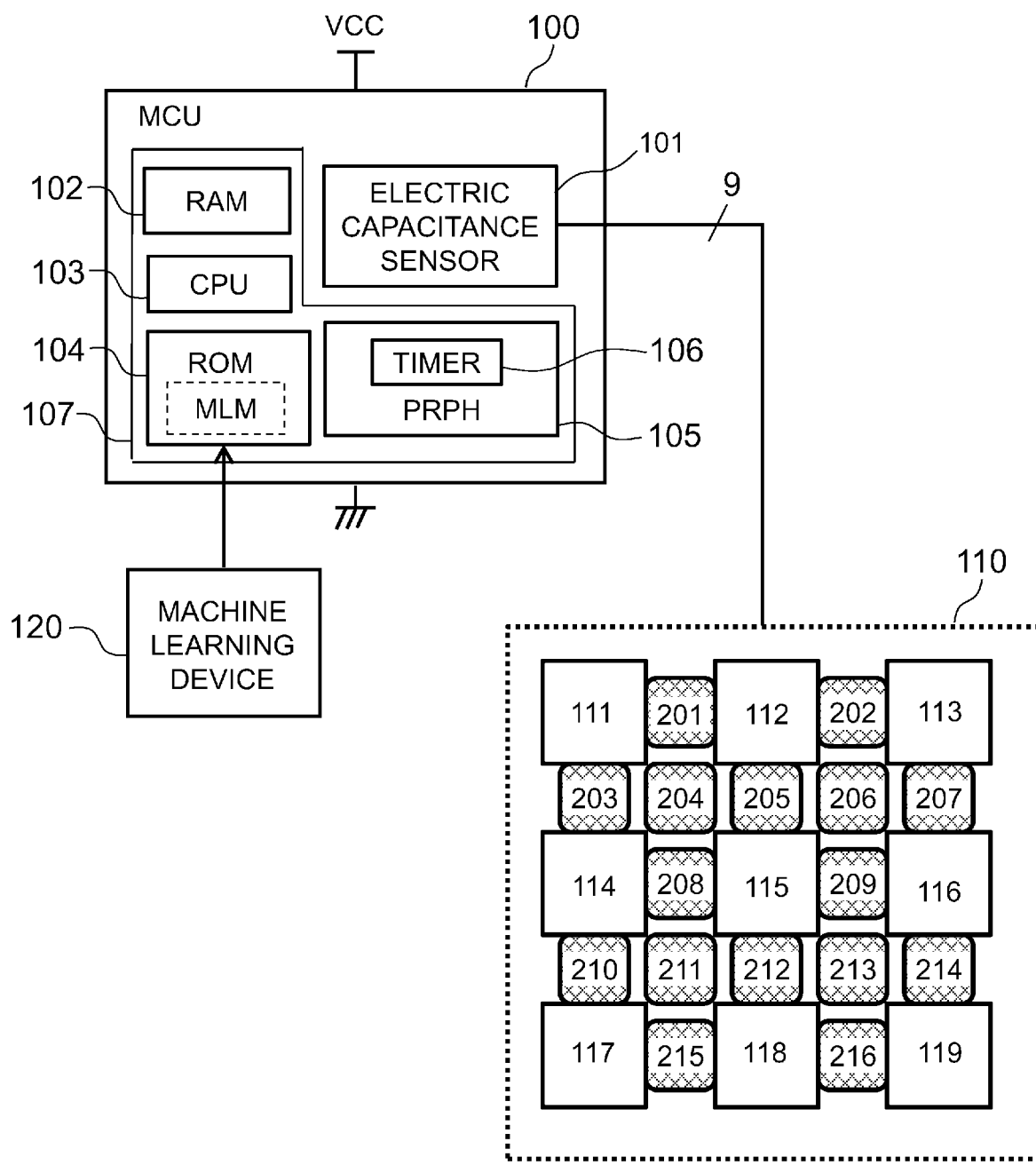
FIG. 13 is a block diagram showing a configuration of a character recognition device in a second modification example.

A configuration of the character recognition device of the second modification example will be described with reference to FIG. 13. FIG. 13 is a block diagram showing a configuration of a character recognition device in the second modification example.

The configurations of the MCU 100 and the touch key group 110 in the character recognition device of the second modification example are the same as those of the character recognition device of the first modification example. However, the ROM 104 stores a learned model MLM in which the reference pattern is learned in advance by a machine learning device 120. The control device 107 of the second modification example uses electric-capacitance sensing data of the nine touch keys 111 to 119 in the touch key group 110 and the touch keys 111 to 119 lying at the positions of the sixteen virtual keys 201 to 216. The control device 107 records in the RAM 102 the electric-capacitance sensing data, which is an analog amount, as digital data, and makes an inference with a learned model MLM.

Here, the machine learning device 120 detects characters, which are inputted to a touch key group similar to the touch key group 110, by an electric capacitance sensor similar to the electric capacitance sensor 101, and acquires a sampling pattern. Here, the sampling pattern of the second modification example is a digital value represented by multiple bits, unlike the sampling pattern of the embodiment. For example, in a case of 8 bits, it is a 256-level digital value from 0 to 255. The machine learning device 120 acquires sampling patterns for all the characters to be recognized. The machine learning device 120 performs, as learning data, machine learning by using a plurality of sampling patterns acquiring the respective characters, and generates the learned model MLM as a reference pattern. Here, the electric capacitance includes not only one generated by the finger's touch of the positions of the touch keys 111 to 119 but also one generated by the finger's touch of the positions of the virtual keys 201 to 216.

The pattern input in the second modification example is the same as the operation of the embodiment described with reference to FIG. 3. That is, it has no pattern input that traces only an interval between the electrodes of the touch keys.

Figure 14:
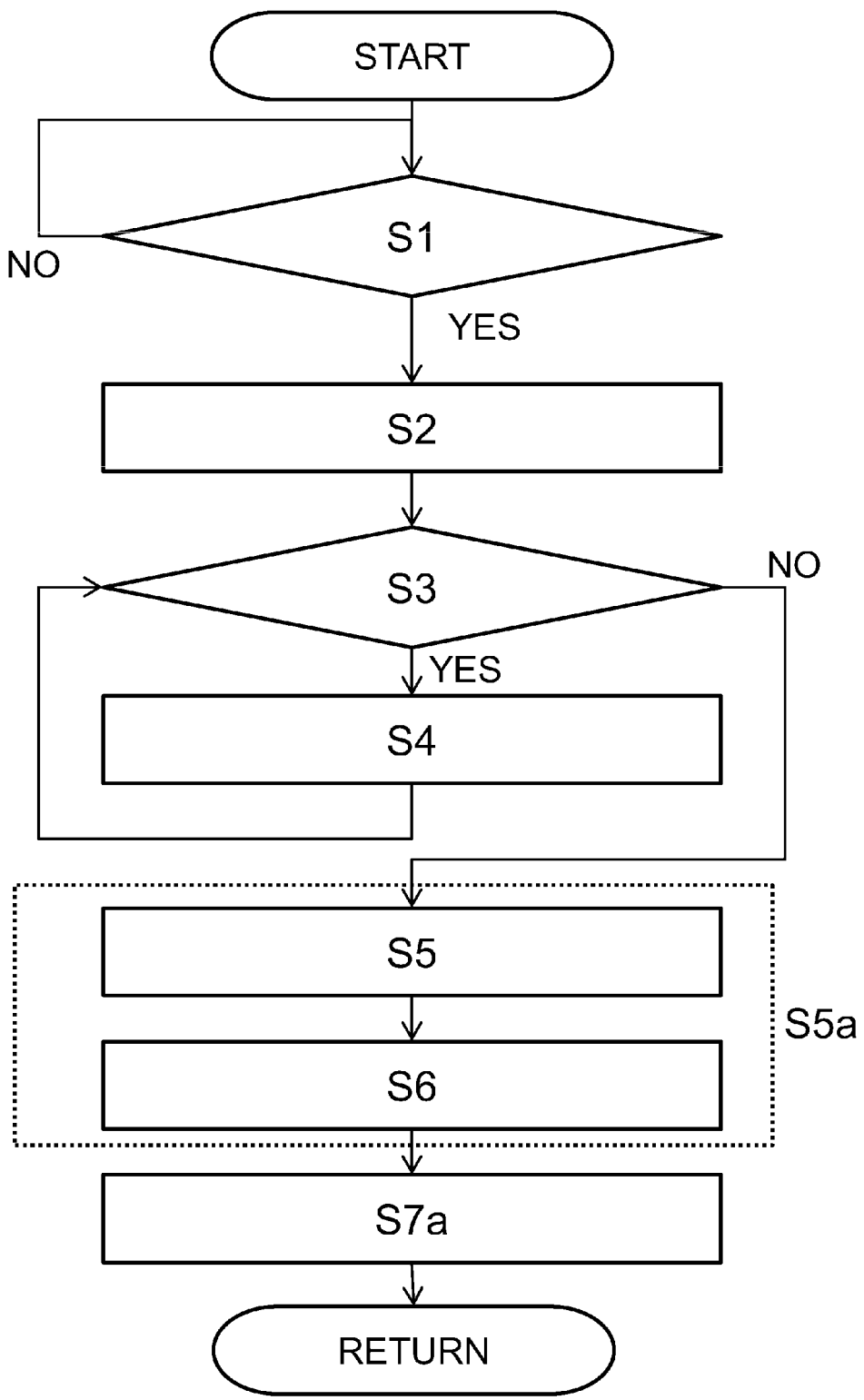
FIG. 14 is a view showing pattern matching by a learned model.
Figure 15:
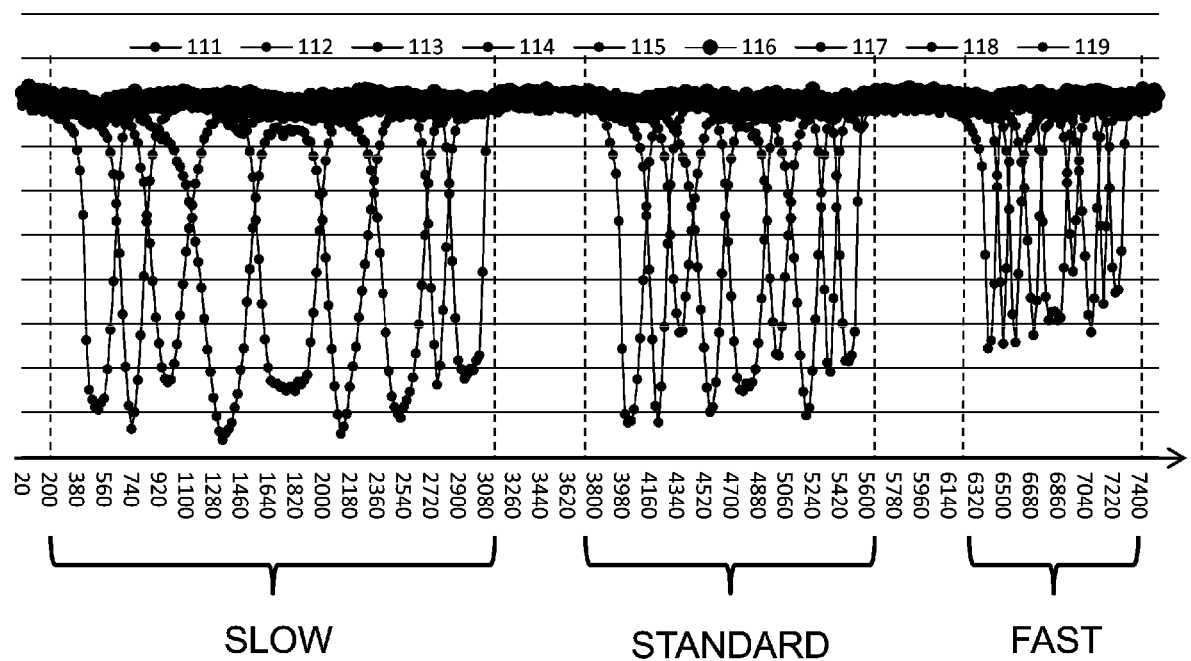
FIG. 15 is a view showing a sampling pattern when the character "3" is inputted in the character recognition device in the second modification example.
Figure 16A:
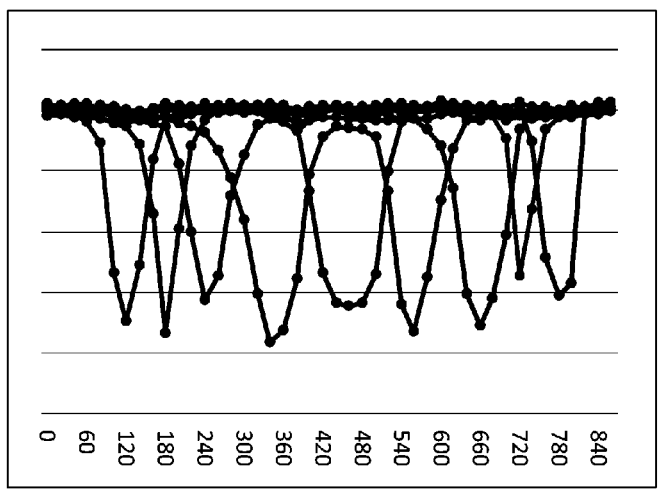
FIG. 16A is a view in which a sampling pattern of the character "SLOW" shown in FIG. 15 is standardized to forty samples.
Figure 16B:
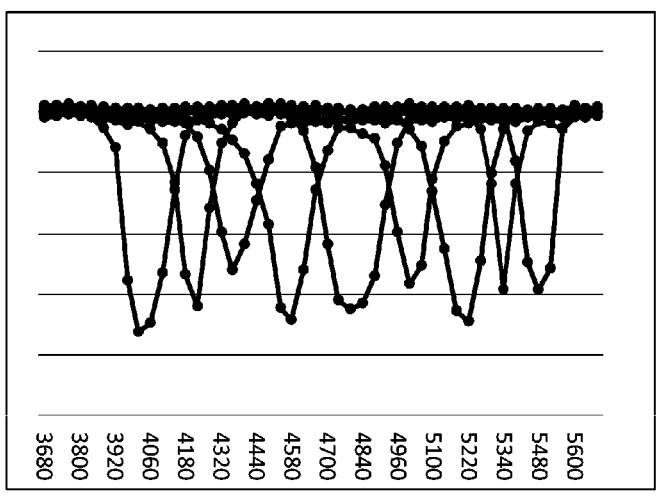
FIG. 16B is a view in which a sampling pattern of the character "STANDARD" shown in FIG. 15 is standardized to the forty samples.
Figure 16C:
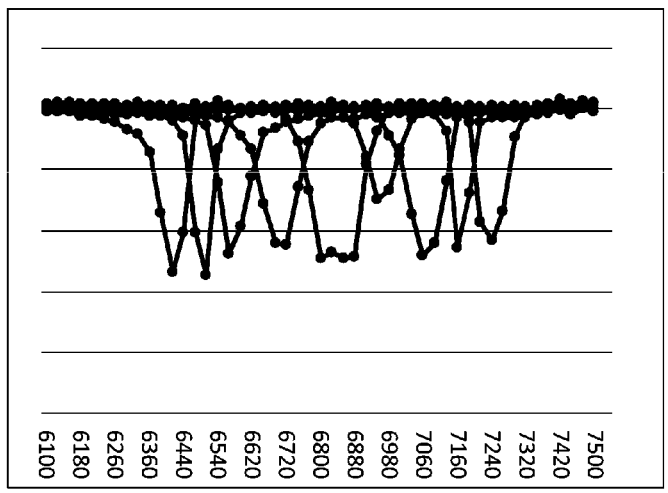
FIG. 16C is a view in which a sampling pattern of the character "FAST" shown in FIG. 15 is standardized to the forty samples.
Figure 17:
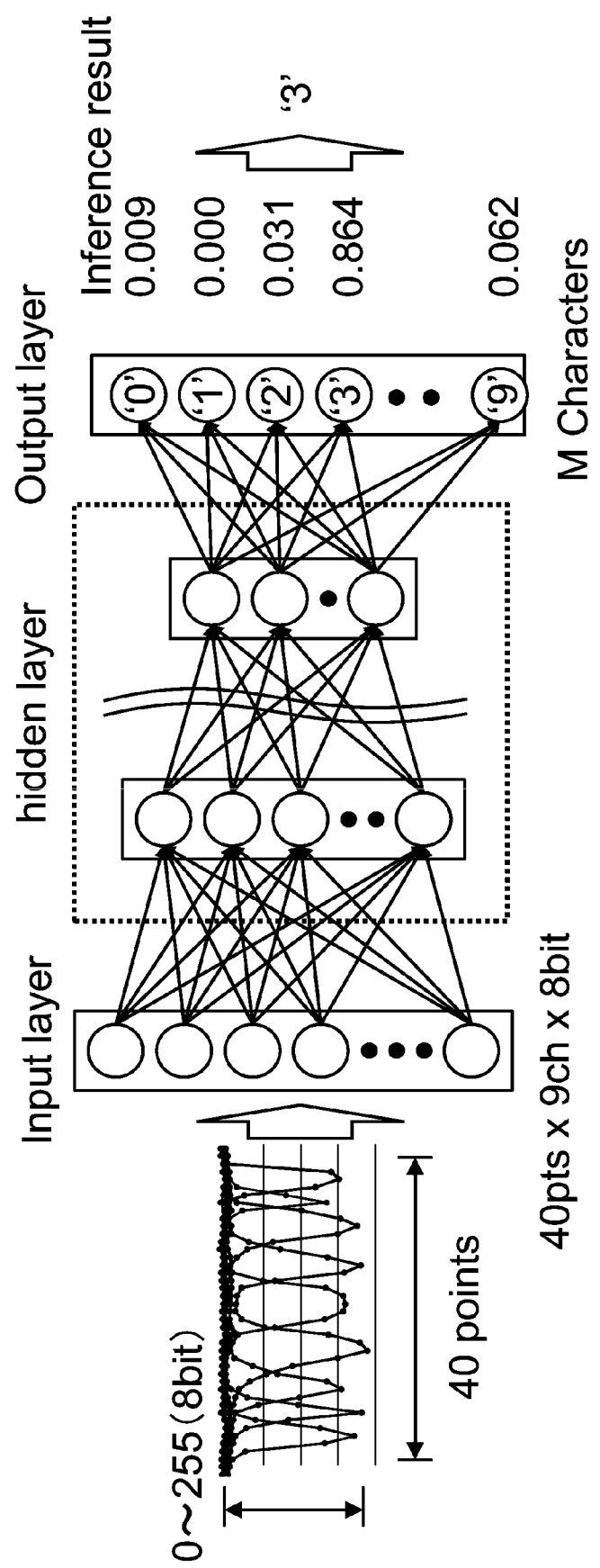
FIG. 17 is a view showing pattern matching by a learned model in the second modification example.

The pattern recognition will be described with reference to FIG. 14. FIG. 14 is a flowchart showing pattern recognition in the second modification example. FIG. 15 is a view showing a sampling pattern when the character "3" is inputted to the character recognition device in the second modification example. FIG. 16A is a view in which a "slow" sampling pattern shown in FIG. 15 is standardized to 40 samples. FIG. 16B is a view in which a "standard" sampling pattern shown in FIG. 15 is standardized to 40 samples. FIG. 16C is a view in which a "fast" sampling pattern shown in FIG. 15 is standardized to 40 samples. FIG. 17 is a view showing pattern matching by the learned model in the second modification example.

In steps S1 to S4, the control device 107 performs (a) starting-point detection, (b) recording of a detection state, and (c) end-point detection in the same manner as in those of the first modification example.
(Pre-Processing: Step S5a)
(Frame Segmentation: Step S5, Time Axis Scaling: Step S6)
(d) Data Standardization of Sampling Patterns As shown in FIG. 15, variations in intensities of the sensing data on the time axis and the electric capacitance occur due to individual differences and a change in input times and/or writing pressures for each pattern input. Here, a horizontal axis shown in FIG. 15 is time, and a vertical axis is data detected by the electric capacitance sensor 101. Since a data size of an input layer is fixed depending on the learned model, the control device 107 standardizes the data on the sampling patterns. The learning data used for the machine learning uses the data-standardized learning data, and an input of the sensing data to the learning model also uses, in inputting it, the algorithm-standardized data similarly thereto.
(d-1) Standardization of Time Axis Data The input time is proportional to the number of pieces of sampling data. Standardization of time axis data involves thinning out the number of samples so as to match with a unit time and/or performing data interpolation. The unit time is a data size of an input layer of the learned model. For example, if the input is "slow" as shown in FIG. 15, the data is interpolated and the sampling pattern is standardized to the 40 samples as shown in FIG. 16A. If the input is "fast" as shown in FIG. 15, the data is thinned out and the sampling pattern is standardized to the 40 samples as shown in FIG. 16C.
(d-2) Standardization of Number of Quantization Bits Since variations in the pieces of data detected by the electric capacitance sensor 101 occur depending on the writing pressure at an input time, the control device 107 standardizes those. The control device 107 standardizes each touch key so that a peak value is maximized, or standardizes the touch key having the highest peak value among all the touch keys to apply its standardization coefficient to the other touch keys. Here, the standardization of the number of quantization bits is assumed to be an amount of information larger than one bit (binary).
(AI Inference: Step S7a)
(e) Pattern Matching by Learned Model As shown in FIG. 17, the control device 107 inputs a standardized sampling pattern to the learned model MLM and performs pattern matching of the reference patterns by inference. Here, an input layer of the learned model MLM has 9 channels, thereby leading to inputting 9 sampling patterns. In addition, an output layer is designed to output probabilities of M characters. A hidden layer of the learned model MLM is deep learning comprising multiple layers. The sampling pattern shown in FIG. 17 is a sampling pattern when the character "3" is inputted. Each sampling pattern of the touch keys 111 to 119 is standardized to the 40 patterns with an 8-bit digital value.

The control device 107 inputs each sampling pattern of the touch keys 111 to 119 into the input layer, and outputs the respective probabilities of the characters "0" to "9". As shown in FIG. 17, the probability of the character "3" is "0.864", and the control device 107 recognizes that the inputted sampling pattern is the character "3".

According to the second modification example, inference using the analog sensing data and the learned model makes it easier to detect feature points of the input pattern and it possible to improve the accuracy of the pattern detection.

Third Modification Example

Figure 18A:
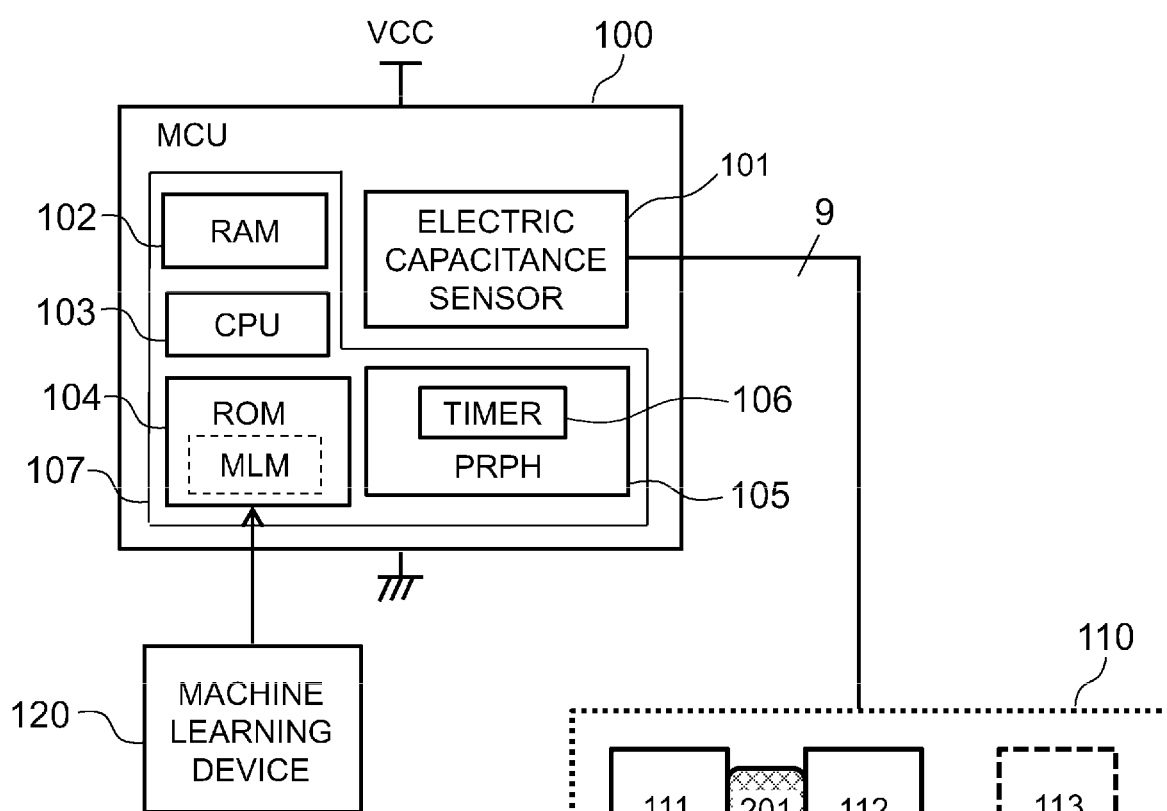
FIG. 18A is a view showing a configuration of a character recognition device in a third modification example.
Figure 18B:
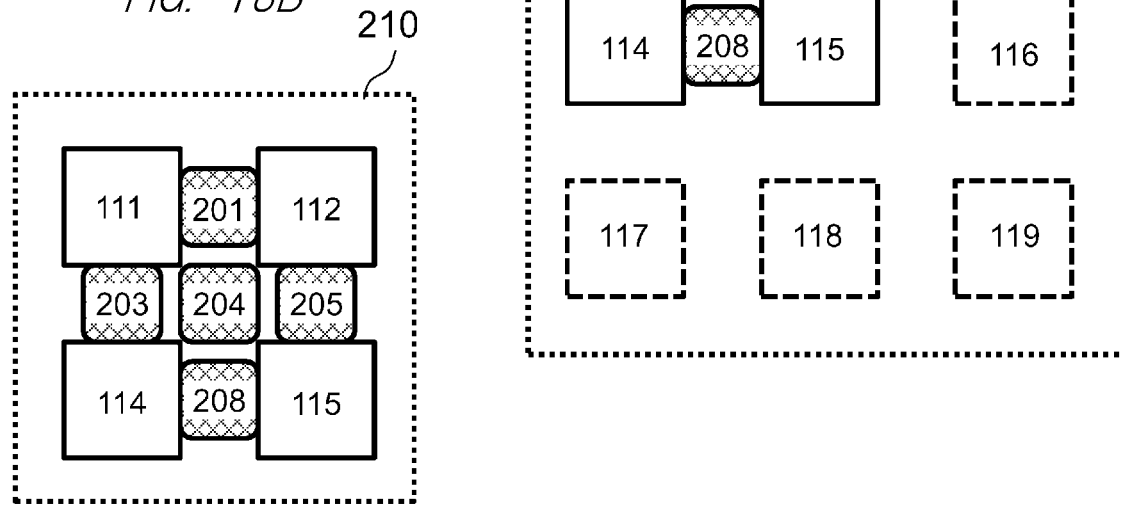
FIG. 18B is a view showing an example using as four electrodes a touch key group formed into a 2×2 matrix.
Figure 20A:
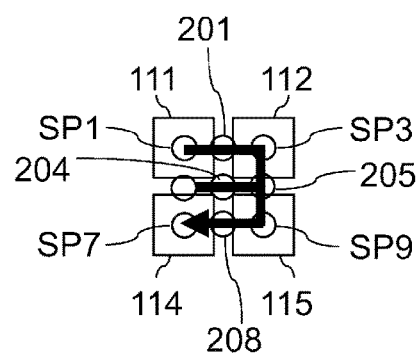
FIG. 20A is a view showing an input pattern of the character "3" in the third modification example.
Figure 20B:
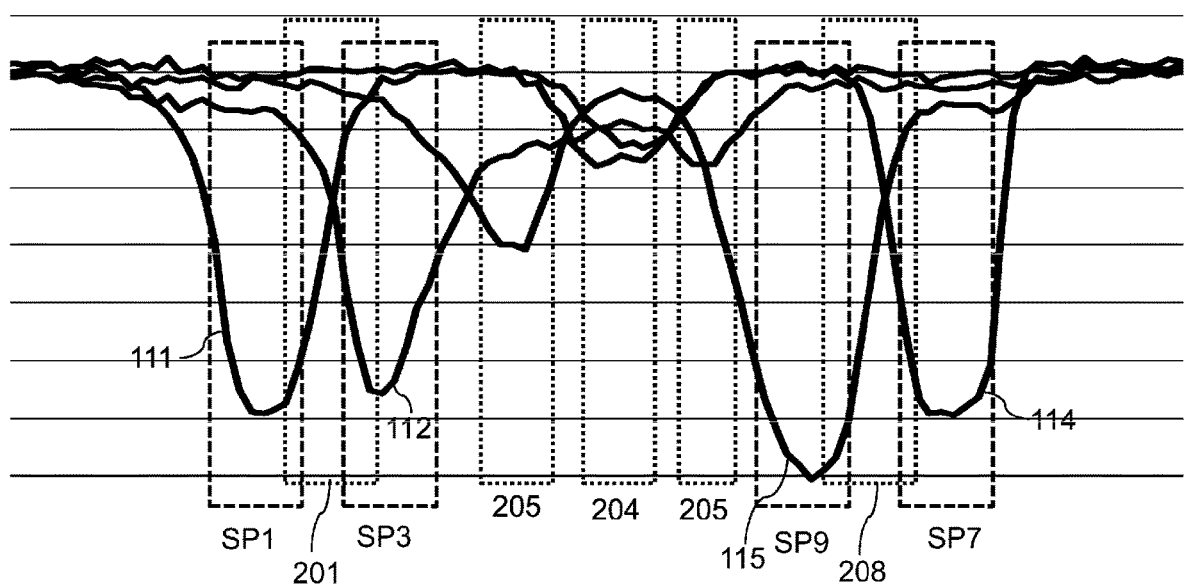
FIG. 20B is a view showing electric capacitance of a touch key where the character "3" is inputted.

A character recognition device in a third modification example will be described with reference to FIGS. 18 to 20. FIG. 18A is a view showing a configuration of a character recognition device in a third modification example. FIG. 18B is a view showing an example in which a touch key group comprising a 2×2 matrix is used as four electrodes. FIG. 19 is a view showing an example of input patterns of numbers in the third modification example. FIG. 20A is a view showing an input pattern of the character "3" in the third modification example. FIG. 20B is a view showing electric capacitance of the touch key when the character "3" is inputted.

As shown in FIG. 18A, not all the touch keys in the touch key group 110 are used, but arbitrary 4 electrodes and virtual keys adjacent to each other, which are arranged in a grid pattern, are used. For example, used are electric-capacitance sensing data of the four electrodes of the four touch keys 111, 112, 114, 115 and the touch keys 111, 112, 114, 115 lying at the positions of the five virtual keys 201, 203, 204, 205, 208. The control device 107 may record as digital data in the RAM 102 the capacitive sensing data which is an analog amount, and perform inference with the learned model. This makes it possible to reduce resources used by the MCU 100 while accuracy of the pattern recognition is maintained (retained). Instead of the touch key group 110, a touch key group 210 comprising the four electrodes of the touch keys 111, 112, 114, 115 as shown in FIG. 18B may be used.

The pattern to be recognized is inputted by tracing the electrodes of the touch key group 110 from the starting point to the end point without releasing the finger therefrom similarly to the embodiment. However, since the number of electrodes is smaller than that of the embodiment, there is a locus that traces only the interval between the electrodes depending on the characters. These characters are "1", "2", "3", "4", "5", "6", "9" as shown in FIG. 19. For example, when the character "3" is inputted, as shown in FIG. 20A, a reference point SP1, a virtual key 201, a reference point SP3, a virtual key 205, a virtual key 204, a virtual key 205, and a reference point SP9, a virtual key 208, and a reference point SP7 are traced in this order by the finger so as to be continuously turned ON. A change in the electric capacitance of the touch keys 111, 112, 114, 115 in this case is shown in, for example, FIG. 20B. the pattern matching is performed including the electric capacitance of the touch keys 111, 112, 114, 115 lying at the positions of the virtual keys 201, 204, 205, 208.

Figure 21:
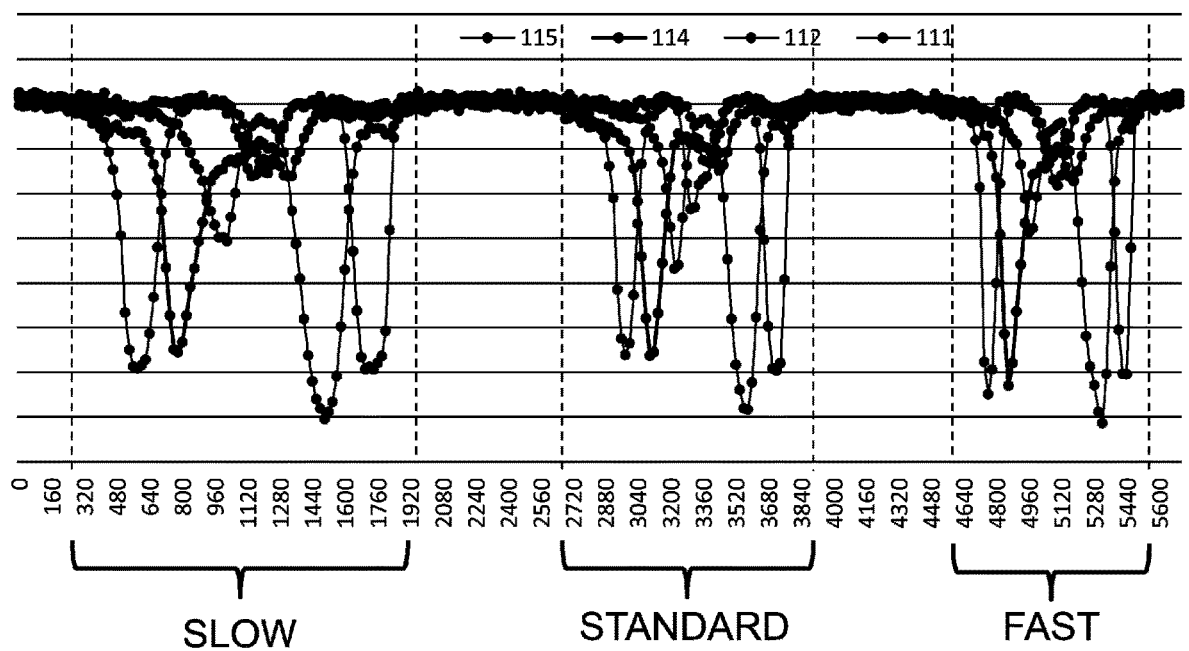
FIG. 21 is a view showing a sampling pattern when the character "3" is inputted to the character recognition device of the third modification example.
Figure 22A:
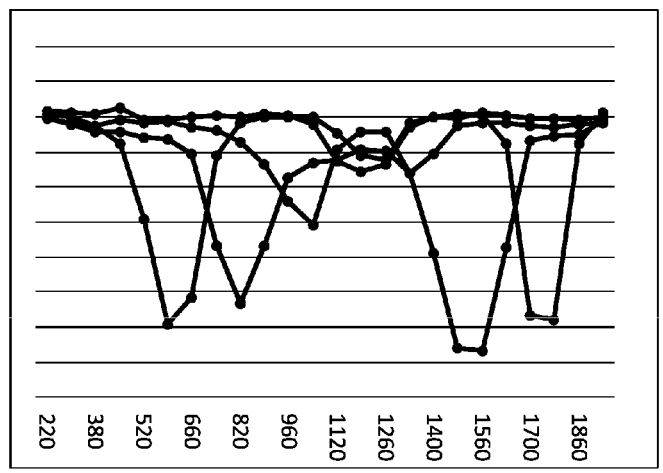
FIG. 22A is a view in which a sampling pattern of the character "SLOW" shown in FIG. 21 is standardized to forty samples.
Figure 22B:
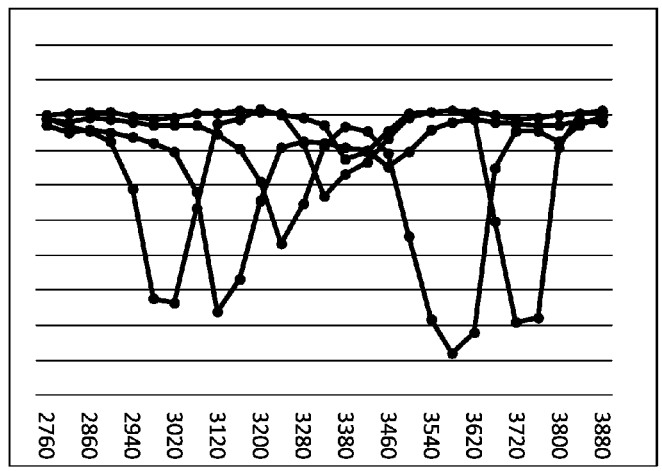
FIG. 22B is a view in which a sampling pattern of the character "STANDARD" shown in FIG. 21 is standardized to the forty samples.
Figure 22C:
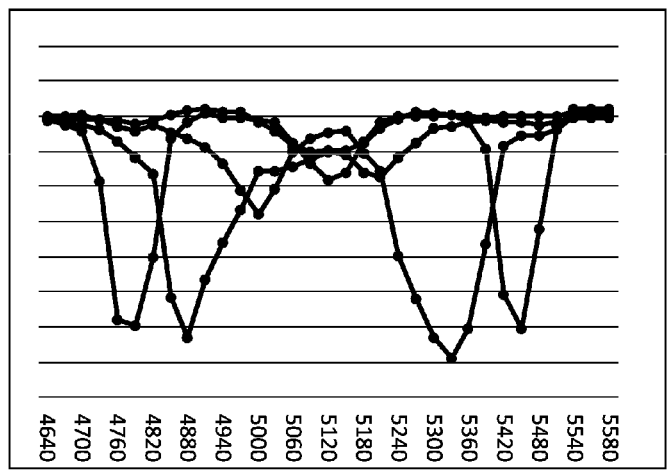
FIG. 22C is a view in which a sampling pattern of the character "FAST" shown in FIG. 21 is standardized to the forty samples.

The standardization of time axis data in the third modification example will be described with reference to FIGS. 21 to 22. FIG. 21 is a view showing a sampling pattern when the character "3" is inputted to the character recognition device in the third modification example. FIG. 22A is a view in which the "slow" sampling pattern shown in FIG. 19 is standardized to 40 samples. FIG. 22B is a view in which the "standard" sampling pattern shown in FIG. 21 is standardized to the 40 samples. FIG. 22C is a view in which the "fast" sampling pattern shown in FIG. 21 is standardized to the 40 samples.

Similar to the second modification example, in the control device 107, the time axis data by thinning out the number of samplings is standardized so as to match with the unit time, and data interpolation is performed. For example, if the input is "slow" as shown in FIG. 21, the data is interpolated and the sampling pattern is standardized to the 40 samples as shown in FIG. 22A. If the input is "fast" as shown in FIG. 21, the data is thinned out and the sampling pattern is standardized to the 40 samples as shown in FIG. 22C.

Figure 23:
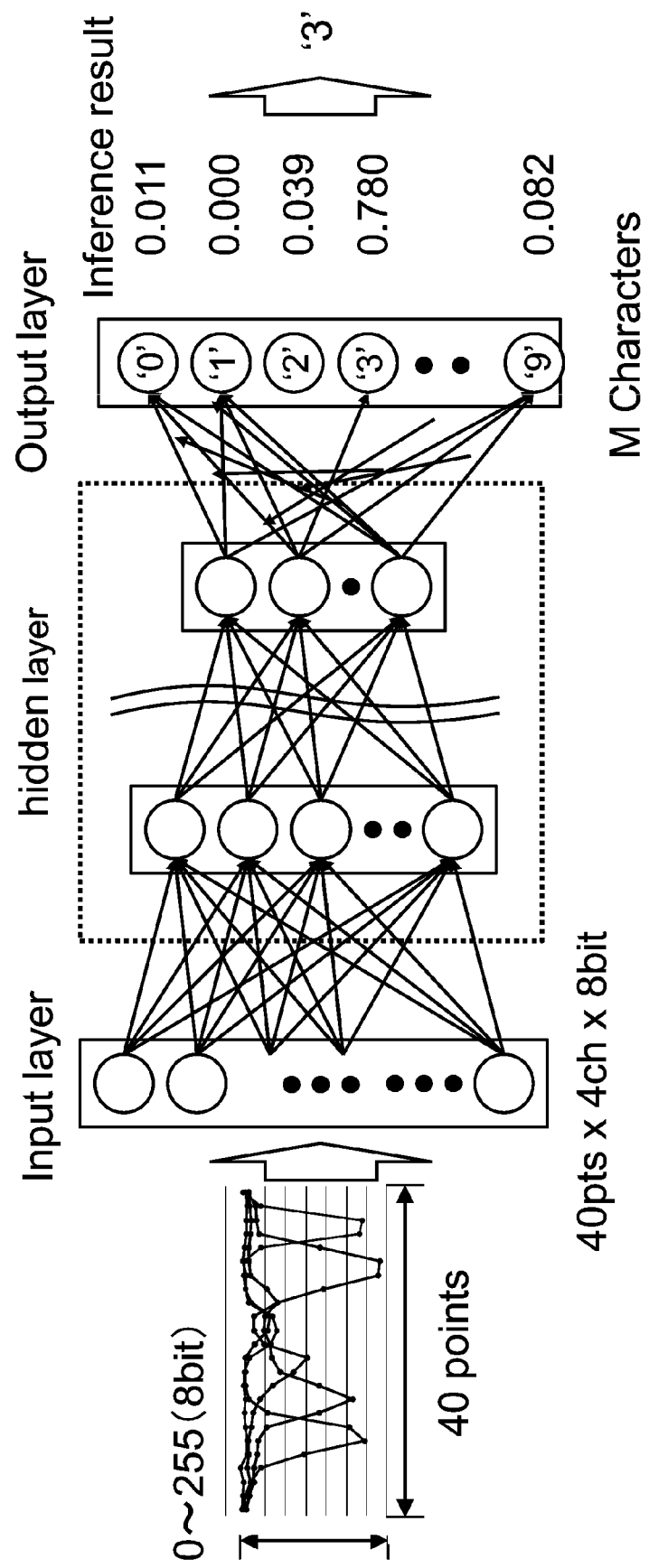
FIG. 23 is a view showing pattern matching by a learned model in the third modification example.

The pattern matching (step S7a) by the learned model in the third modification example will be described with reference to FIG. 23. FIG. 23 is a view showing pattern matching by the learned model.

As shown in FIG. 23, the control device 107 inputs the standardized sampling pattern into the learned model MLM and performs the pattern matching of the reference pattern by inference. Here, an input layer of the learned model MLM has 4 channels, thereby leading to inputting 4 sampling patterns. In addition, an output layer is designed to output probabilities of M characters. A hidden layer of the learned model MLM is deep learning comprising multiple layers. The sampling pattern shown in FIG. 23 is a sampling pattern when the character "3" is inputted. Each sampling pattern of the touch keys 111 to 119 is standardized to the 40 patterns with an 8-bit digital value.

The control device 107 inputs each sampling pattern of the touch keys 111, 112, 114, 115 to the input layer, and outputs the respective probabilities of the characters "0" to "9". As shown in FIG. 23, the probability of the character "3" is "0.780", and the control device 107 recognizes that the inputted sampling pattern is the character "3".

According to the third modification example, even if the number of electrodes of the touch keys is reduced, the resource of the MCU can be reduced without lowering the accuracy of the pattern detection. This makes it possible to be selected according to performance of the MCU.

Fourth Modification Example

Figure 24:
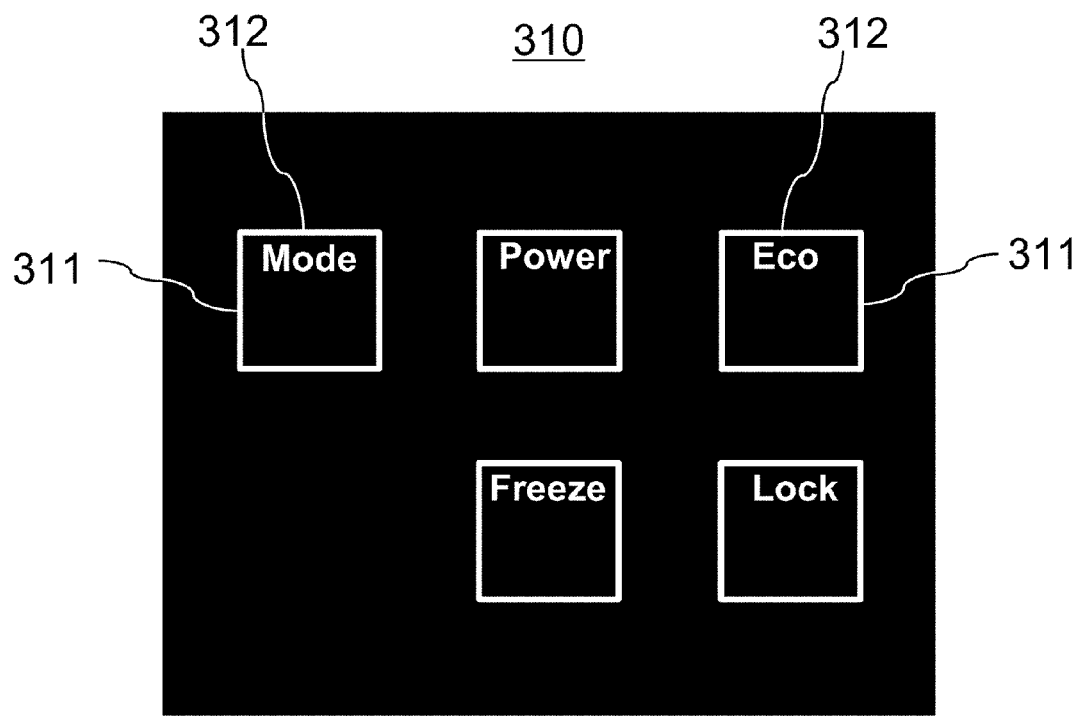
FIG. 24 is a top view of a first mode state in a touch key group in a fourth modification example.
Figure 25:
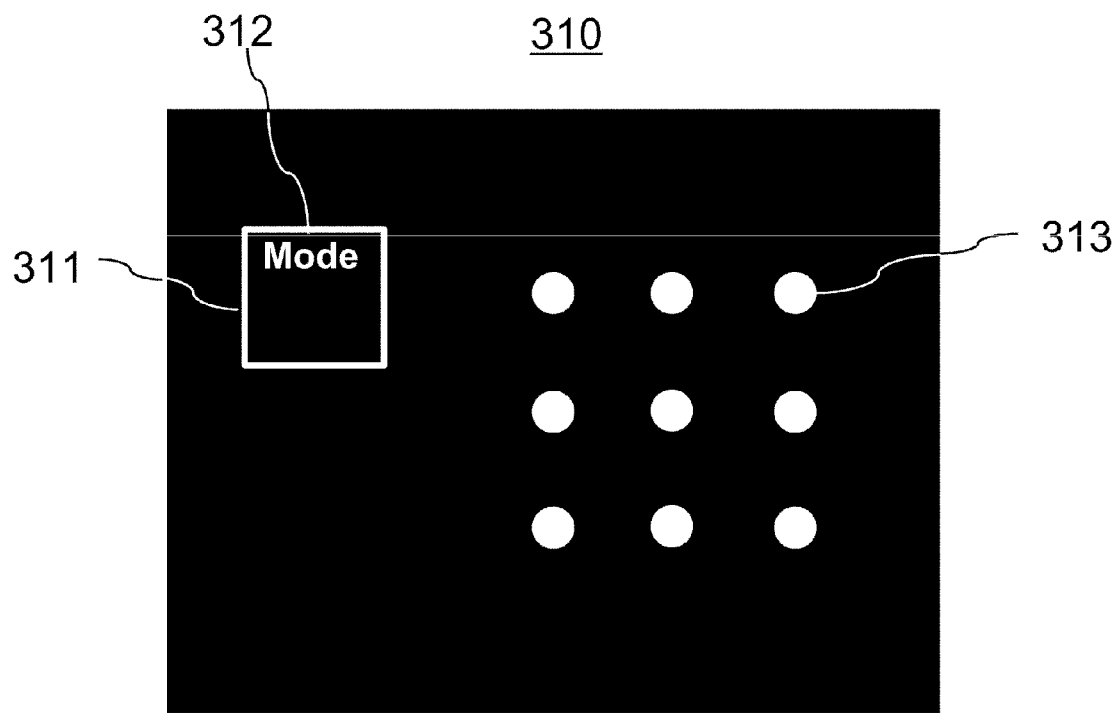
FIG. 25 is a top view of a second mode state in the touch key group in the fourth modification example.
Figure 26A:
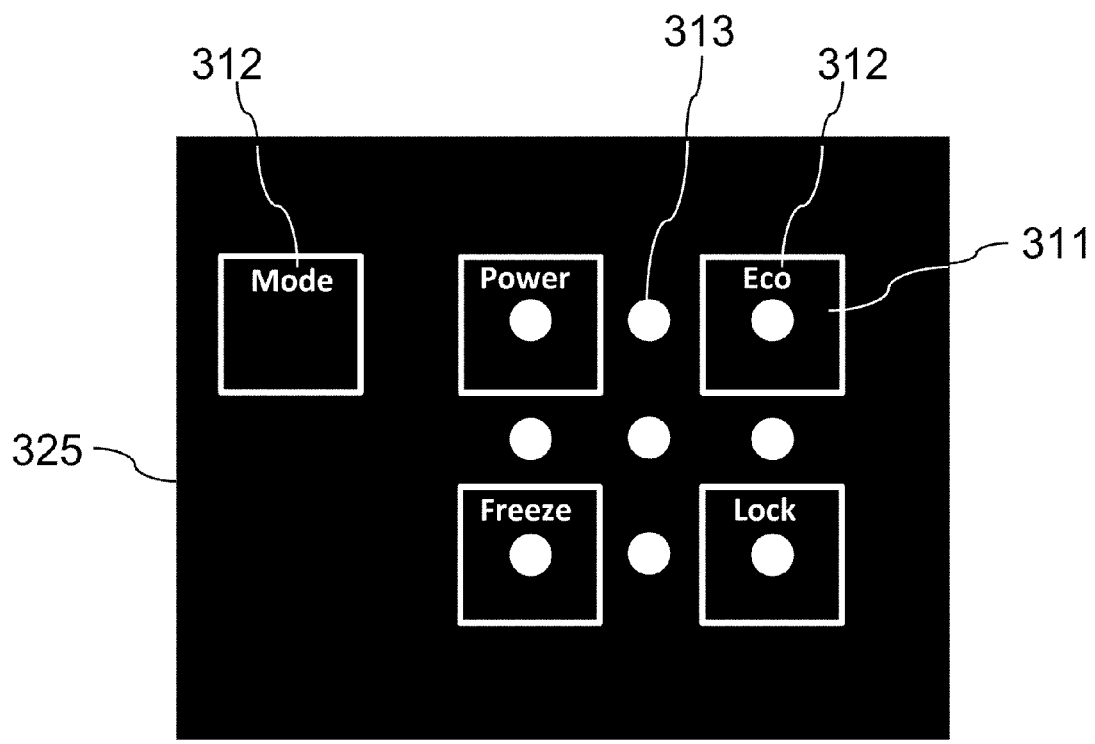
FIG. 26A is a top view showing an overlay panel of the touch key group in the fourth modification example.
Figure 26B:
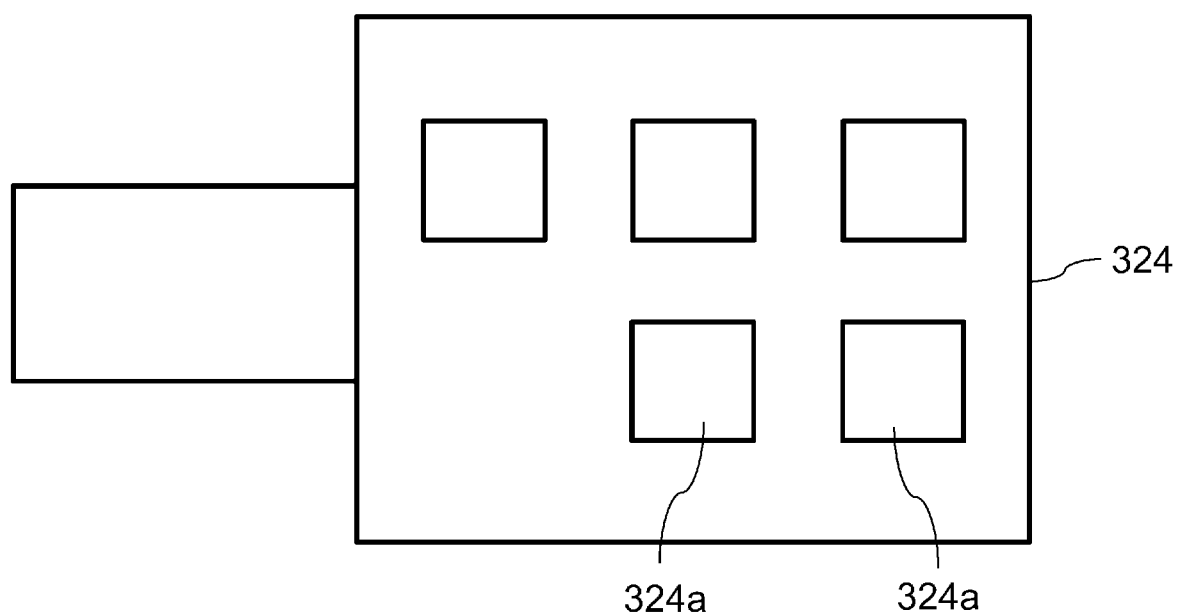
FIG. 26B is a top view showing a transparent film electrode of the touch key group in the fourth modification example.
Figure 26C:
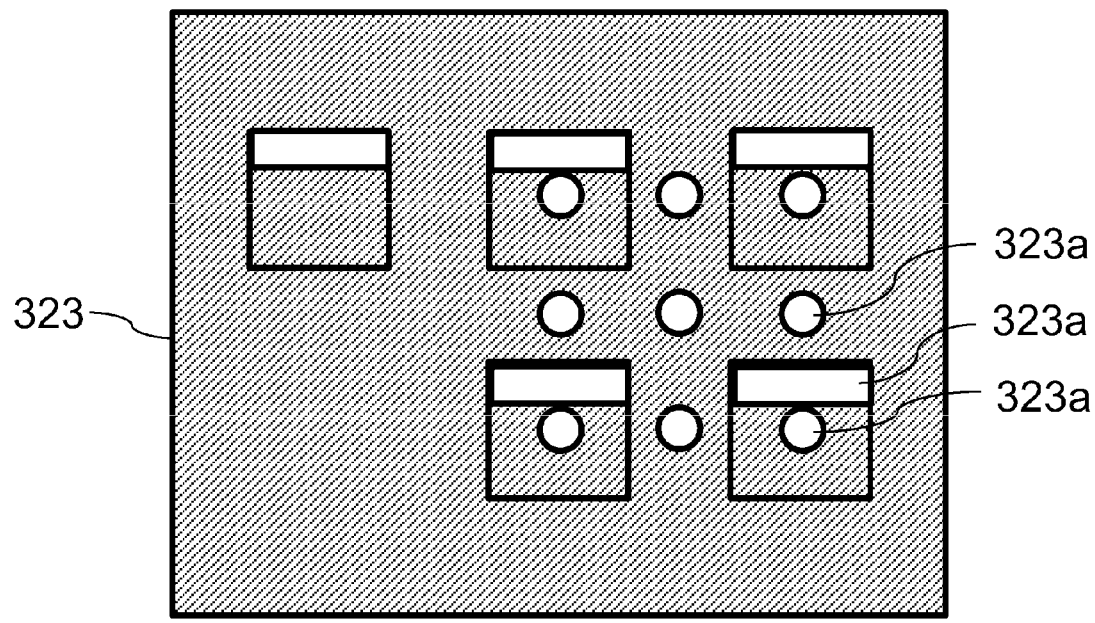
FIG. 26C is a top view showing a light-shielding plate of the touch key group in the fourth modification example.
Figure 26D:
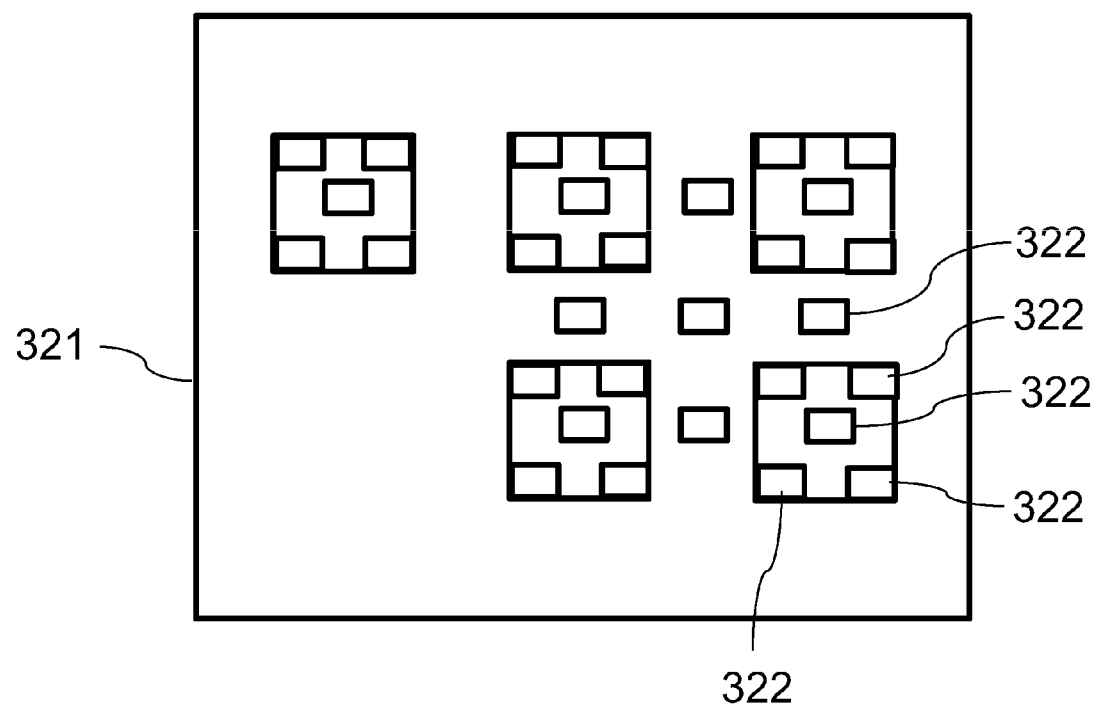
FIG. 26D is a top view showing a PCB of the touch key group of the fourth modification example.
Figure 27:
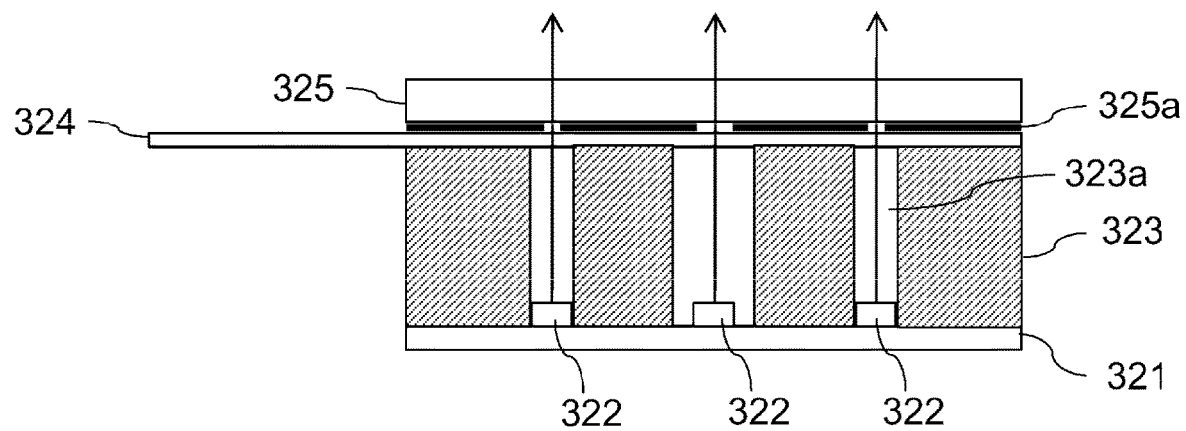
FIG. 27 is a sectional view of the touch key group in the fourth modification example.

A configuration of a touch key group of a fourth modification example will be described with reference to FIGS. 24 to 27. FIG. 24 is a top view of a first mode state of the touch key group in the fourth modification example. FIG. 25 is a top view of a second mode state of the touch key group in the fourth modification example. FIG. 26A is a top view showing an overlay panel of the touch key group in the fourth modification example. FIG. 26B is a top view showing a transparent film electrode of the touch key group in the fourth modification example. FIG. 26C is a top view showing a light-shielding plate of the touch key group in the fourth modification example. FIG. 26D is a top view showing a PCB of the touch key group in the fourth modification example. FIG. 27 is a sectional view of the touch key group in the fourth modification example.

In a touch key group 310 in a fourth modification example, a key display between a touch key input mode and a character recognition mode can be switched by a toggle of a mode key. Here, the touch key input mode is an input performed by using one single touch key, and functions as a tact key. The character recognition mode is an input performed by using a plurality of touch keys and displays, as shown in FIG. 24, a key frame 311 and a key name 312 in the touch key input mode. For example, in FIG. 24, five rectangular frames are displayed for the key frame 311, and "Mode", "Power", "Eco", "Freeze", and "Lock" are displayed as the key names 312. As shown in FIG. 25, a reference point 313 is displayed in the character recognition mode. For example, in FIG. 25, nine white dots are displayed.

A light-shading plate 323 shown in FIG. 26C is arranged on a PCB on which a LED 322 shown in FIG. 26D is mounted. On the light-shielding plate 323, a transparent film electrode 324 forming a touch key electrode 324a shown in FIG. 26B is arranged. On the transparent film electrode 324, an overlay panel 325 on which the key frame 311, key name 312, and reference point 313 shown in FIG. 26A are printed is arranged.

As shown in FIG. 27, LEDs 322 as light emitting elements arranged on the PCB 321 are divided by the light-shielding plate 323. This makes it possible to independently illuminate the characters of the key name 312 and a line (s) of the reference point 313, etc. printed on a lower surface (printing surface) 325a of an overlay panel 325 directly above the LEDs.

According to the fourth modification example, it has one or more of the following effects.

(1) Switching the LED that lights up based on the mode makes it possible to display only the key frame 311 and key name 312 or display only the reference point 313.

(2) Displaying the reference points at the touch key and its intermediate point makes it possible to correctly pass coordinate points that can be detected in drawing the characters, and to prevent the character or symbol obtained by tracing coordinates having no touch keys from being not correctly recognized.

(3) Switching the modes makes it possible to use both a single key for a normal product operation and a character input key for performing character recognition, so that a character input dedicated key needs not to be prepared and it can be applied also to products etc. having few keys.

Fifth Modification Example

Figure 28:
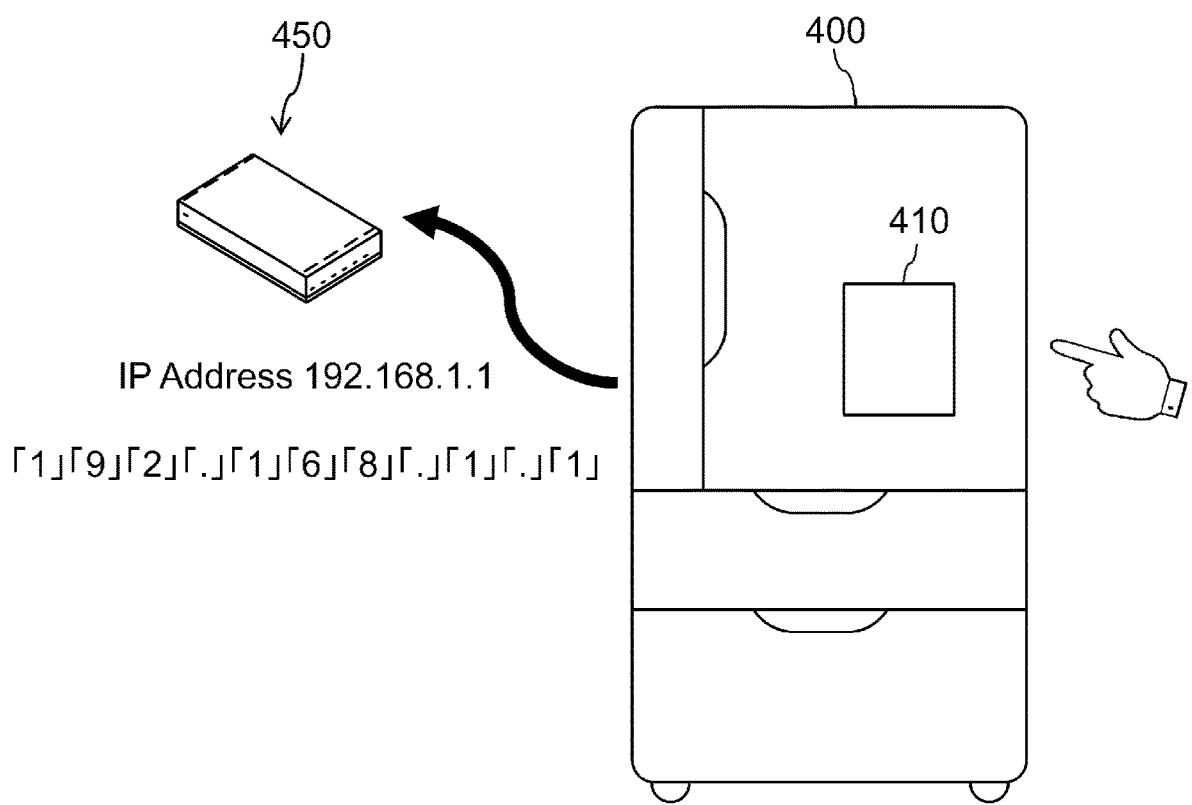
FIG. 28 is a view showing a refrigerator of a fifth modification example.
Figure 29:
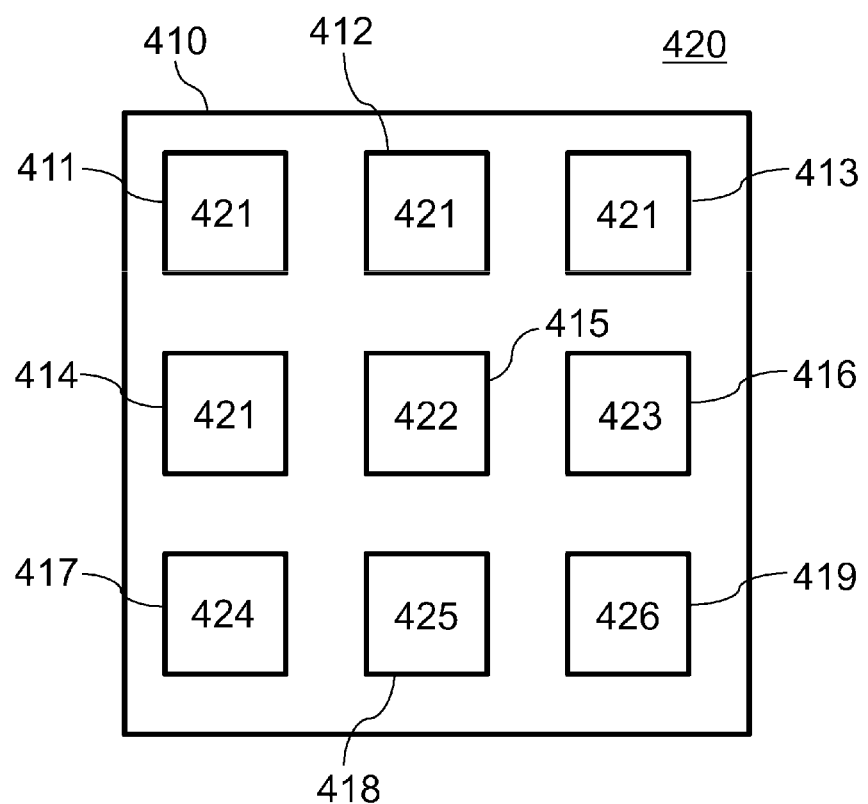
FIG. 29 is a top view of a first mode state of a touch key group in the fifth modification example.
Figure 30:
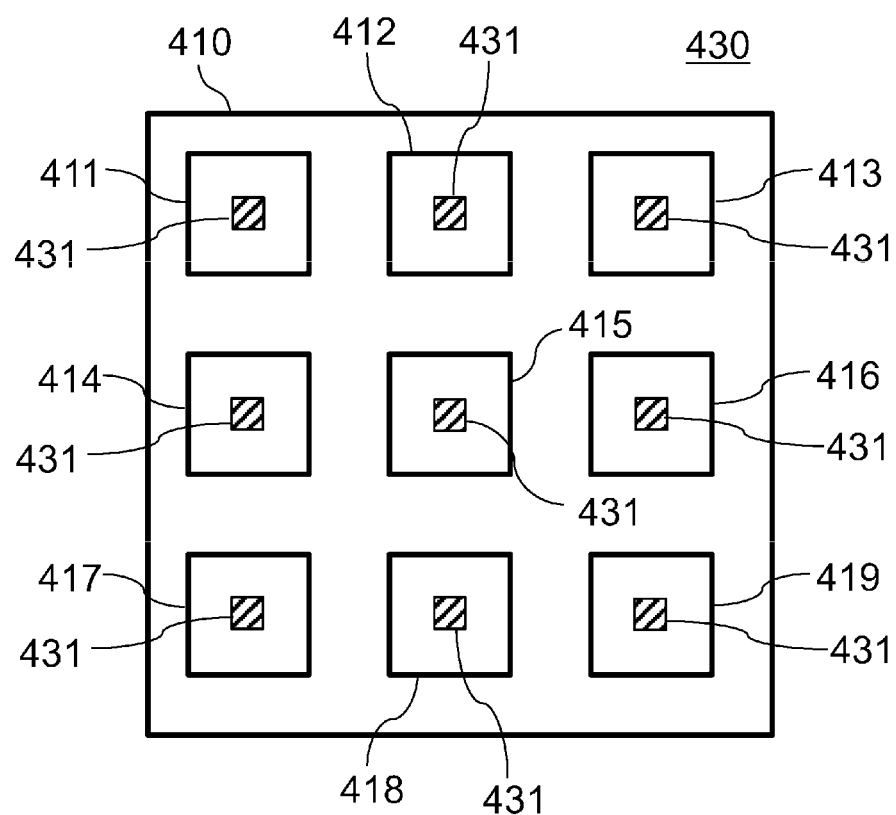
FIG. 30 is a top view of a second mode state of the touch key group in the fifth modification example.

A refrigerator provided with a character recognition device in a fifth modification example will be described with reference to FIGS. 28 to 30. FIG. 28 is a view showing the refrigerator in the fifth modification example. FIG. 29 is a top view of a first mode state of a touch key group in the fifth modification example. FIG. 30 is a top view of a second mode state of the touch key group in the fifth modification example.

As shown in FIG. 28, a refrigerator 400 is provided with a touch key group 410 comprising an electric capacitive touch key group on a surface of a door, and switches to a temperature adjustment and power saving mode by a touch key operation. The touch key group 410 is controlled by the same MCU as the MCU 100 of the embodiment. The touch key group 410 has a touch key input mode 420 and a character recognition mode 430 as touch key operation modes. In a case of the touch key input mode 420, functions assigned to the touch keys are displayed as shown in FIG. 27. For example, each of touch keys 411 to 414 displays a power saving mode 421; a touch key 415 displays a refrigerating function mode 422; and a touch key 416 displays a character recognition mode 423. Further, a touch key 417 displays an ECO mode 424; a touch key 418 displays an ice making mode 425; and a touch key 417 displays a key lock mode 426.

When the touch key 416 displaying the character recognition mode is pressed, the control device 107 detects the ON state of the touch key 416 by the electric capacitance sensor 101 and switches the touch key group 410 to the character recognition mode 430. When the character recognition mode is switched to the character recognition mode 430, the touch key group 410 displays reference points 431 traced with the finger for the character recognition as shown in FIG. 30. By tracing these reference points 431, a user causes the control device 107 to recognize characters via the touch key group 410. In the character recognition mode 430, the touch key group 410 performs the pattern recognition in the same manner as that of the touch key group 110 in the embodiment. As shown in FIG. 28, an IP address is inputted by the character recognition, and the refrigerator 400 is connected to a home network 450. For example, when the IP address is "192.168.1.1", the characters "1", "9", "2", ".", "1", "6", "8", ".", "1", ".", and "1" are traced by the touch key in this order according to the input pattern shown in FIG. 3. In the character recognition mode 430, the user switches to the touch key input mode 420 by pressing two arbitrary touch keys at the same time.

According to the fifth modification example, a switching dedicated touch key to the character recognition mode like the fourth modification example needs not to be provided, and the number of touch keys can be reduced.

As described above, the disclosure made by the present disclosers has been specifically explained based on the embodiments and modification examples, but the present disclosure is not limited to the above-mentioned embodiments and modification examples and, needless to say, can be variously altered and changed.

What is claimed is:

1. A semiconductor device comprising:
a sensor detecting electric capacitance of a touch key group, the touch key group comprising a plurality of touch keys arranged in a matrix; and
a control device configured to perform character recognition based on a change in electric capacitance of the plurality of touch keys detected by the sensor and on a sampling pattern that is time-series data of a locus, wherein the control device sets a virtual key to an interval between electrodes used for the touch keys.

2. The semiconductor device according to claim 1, wherein the control device is configured to detect an ON or OFF state of each of the touch keys by comparing the detected electric capacitance with a predetermined threshold value, and
wherein the sampling pattern is a binary time-series data of the ON or OFF state.

3. The semiconductor device according to claim 1, wherein the control device performs character recognition based on a change in electric capacitance of the virtual key and on a sequence pattern in which the time-series data of the locus is contained in the sampling pattern.

4. The semiconductor device according to claim 3, wherein the control device is configured so that the electric capacitance of the virtual key is calculated based on electric capacitance of the electrodes of the adjacent touch keys.

5. The semiconductor device according to claim 4, wherein the control device is configured to detect the ON or OFF state of each of the touch keys by comparing the detected electric capacitance with a predetermined threshold value,
wherein the sampling pattern is binary time-series data of the ON or OFF state, and wherein the control device is configured to calculate the ON or OFF state of the virtual key by a binary logical operation of the ON or OFF states of the adjacent touch keys.

6. The semiconductor device according to claim 1, wherein the control device is configured to perform the character recognition based on a change in electric capacitance prepared for each character, a reference pattern that is time-series data of a locus, and the sampling pattern.

7. The semiconductor device according to claim 1, wherein the control device has a learned model, and is configured to perform the character recognition by inferring from the sampling pattern by the learned model.

8. The semiconductor device according to claim 7, wherein the control device is configured to standardize a time axis that matches the number of samples of the sampling pattern with a data size of an input layer of the learned model.

9. The semiconductor device according to claim 7, wherein the control device is configured to perform character recognition by inferring from the learned model, the learned model including in the sampling pattern a change in the electric capacitance of the touch keys at a position of the virtual key and the time-series data of the locus.

10. The semiconductor device according to claim 1, wherein when detecting that a predetermined touch key in the touch key group is turned ON, the control device is configured to switch between a touch key mode due to inputting one of the touch keys and a character recognition mode due to inputting the plurality of touch keys.

11. A character recognition device comprising:
a touch key group having a plurality of touch keys arranged in a matrix;
a sensor detecting electric capacitance of each of the touch keys; and
a control device configured to perform character recognition based on a change in the electric capacitance of each of the touch keys detected by the sensor and on time-series data of a locus,
wherein the control device sets a virtual key to an interval between the electrodes used for the touch keys.

12. The character recognition device according to claim 11,
wherein the touch key group has a touch key mode state due to inputting one of the touch keys and a character recognition mode state due to inputting the plurality of touch keys, and
wherein the character recognition device is configured to display a function of each of the touch keys in the touch key mode state and display a reference point for an input in the character recognition mode state.

13. The character recognition device according to claim 12, wherein the touch key group has a mode key for switching between the touch key mode state and the character recognition mode state.

14. The character recognition device according to claim 13, wherein the mode key is configured to be used for inputting characters in the character recognition mode state.

15. A character recognition method comprising:
detecting electric capacitance of each of a plurality of touch keys traced;
expanding the electric capacitance of each of the detected touch keys into a sampling pattern of time-series data;
performing the character recognition based on the sampling pattern,
setting a virtual key to an interval between the electrodes used for the touch keys.

16. The character recognition method according to claim 15, further comprising:
calculating electric capacitance of the virtual key based on the electric capacitance detected from the electrodes of the adjacent touch keys;
expanding the electric capacitance of each of the detected touch keys and the electric capacitance of the virtual key into the sampling pattern of the time-series data; and
performing the character recognition based on the sampling pattern.

17. The character recognition method according to claim 15, further comprising:
performing the character recognition by comparing the sampling pattern with a reference pattern of time-series data provided in advance for each character to be recognized.

18. The character recognition method according to claim 15, further comprising:
performing the character recognition by inferring from the sampling pattern through a learned model.

* * * * *